United States Patent [19]
Kato et al.

[11] Patent Number: 5,837,951
[45] Date of Patent: *Nov. 17, 1998

[54] INERTIA SWITCHING DEVICE, ACCELERATION RESPONSIVE DEVICE AND METHOD OF MAKING ACCELERATION RESPONSIVE DEVICE

[75] Inventors: Harunori Kato, Mie-ken; Yasukazu Mizutani, Midori-ku; Shigekazu Shibata, Nishi-ku; Katsuhiro Kimura, Moriyama-ku; Hideki Koseki, Aichi-ken; Mitsuhiro Urano, Toyota; Masayuki Watanabe, Minato-ku, all of Japan

[73] Assignee: Ubukata Industries Co., Ltd., Nagoya, Japan

[*] Notice: The term of this patent shall not extend beyond the expiration date of Pat. No. 5,610,338.

[21] Appl. No.: 682,340

[22] Filed: Jul. 25, 1996

Related U.S. Application Data

[63] Continuation-in-part of Ser. No. 121,522, Sep. 16, 1993, abandoned, and Ser. No. 310,390, Sep. 22, 1994, Pat. No. 5,600,109.

[30] Foreign Application Priority Data

| Sep. 16, 1992 | [JP] | Japan | 4-272387 |
| Oct. 29, 1992 | [JP] | Japan | 4-316363 |
| Jan. 20, 1993 | [JP] | Japan | 5-26308 |
| Oct. 1, 1993 | [JP] | Japan | 5-269981 |
| Oct. 6, 1993 | [JP] | Japan | 5-276230 |
| Dec. 15, 1993 | [JP] | Japan | 5-342860 |

[51] Int. Cl.$^6$ ................................................. H01H 35/14
[52] U.S. Cl. ................................................... 200/61.45 R
[58] Field of Search ................ 200/61.45 R–61.45 M; 73/652, 654, 493; 340/690; 367/178

[56] References Cited

U.S. PATENT DOCUMENTS

| 3,619,524 | 11/1971 | Gillund | 200/61.45 |
| 3,818,160 | 6/1974 | Hitchcock | 200/61.45 R |
| 3,916,127 | 10/1975 | Roesch et al. | 200/61.45 |
| 4,001,185 | 1/1977 | Mitsui et al. | 200/61.45 R |

(List continued on next page.)

FOREIGN PATENT DOCUMENTS

| 41-17699 | 8/1966 | Japan | H01H 35/02 |
| 50-123870 | 10/1975 | Japan | H01H 35/02 |
| 50-127654 | 10/1975 | Japan | H01H 35/02 |
| 63-29286 | 2/1988 | Japan | G01V 1/16 |
| 64-79624 | 3/1989 | Japan | G01H 1/00 |
| 2-186224 | 7/1990 | Japan | G01H 1/00 |
| 4-249019 | 9/1992 | Japan | H01H 35/02 |

*Primary Examiner*—Michael A. Friedhofer
*Attorney, Agent, or Firm*—Foley & Lardner

[57] ABSTRACT

A seismosensitive element includes a housing formed from an electrically conductive material and having an inclined face formed on the bottom thereof to gradually rise concentrically outwardly substantially from a center of the inner bottom face, and a header fixed to the housing to close its open end and having through-aperture in which an electrically conductive terminal pin is fixed in an insulated relation. A contact is fixed an end of the terminal pin located inside the housing and has a plurality of feather portions disposed concentrically with the terminal pin, the feather portions having a predetermined elasticity. An inertia ball is enclosed in the housing to be located substantially at the center in the housing in a normal position of the element in a stationary state. The inertia ball rolls when subjected to oscillation, so that the inertia ball slides on the feather portions of the contact except for distal ends of the feather portions such that the inertia ball electrically conducts between the contact and the housing and such that the feather portions are elastically deformed, thereby receiving a force causing the same to be pushed against the bottom of the housing. An acceleration responsive switch includes a receptacle including a housing having a conical face, an inertial ball in the receptacle, and an oscillation damping liquid in the receptacle. The oscillation damping liquid has a viscosity such that the inertial ball terminates rotation when it is subjected to an external oscillation to be rotated.

31 Claims, 17 Drawing Sheets

U.S. PATENT DOCUMENTS

| | | | |
|---|---|---|---|
| 4,185,651 | 1/1980 | Paulson | 137/38 |
| 4,377,210 | 3/1983 | Monte | 169/62 |
| 4,628,160 | 12/1986 | Canevari | 200/61.45 R |
| 5,237,135 | 8/1993 | Wolski | 200/61.45 R |
| 5,396,223 | 3/1995 | Iwabuchi et al. | 340/690 |
| 5,600,109 | 2/1997 | Mizutani et al. | 200/61.45 R |
| 5,610,338 | 3/1997 | Kato et al. | 73/652 |

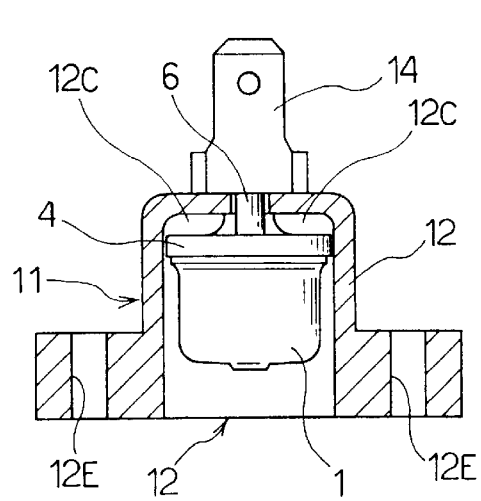
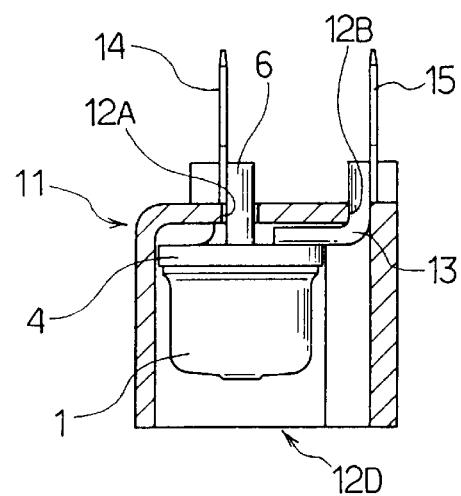
FIG.5  FIG.6
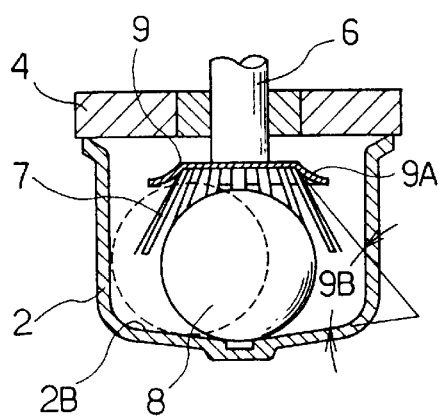
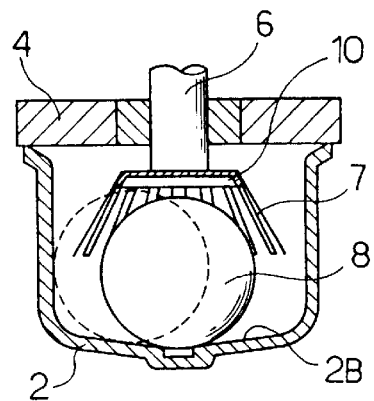
FIG.7  FIG.8
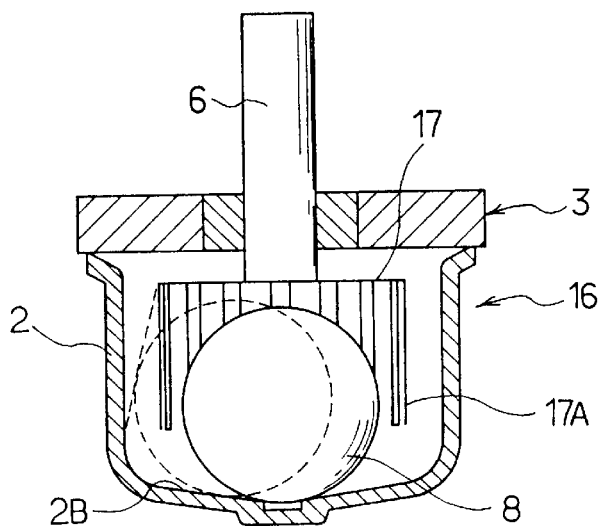
FIG.9

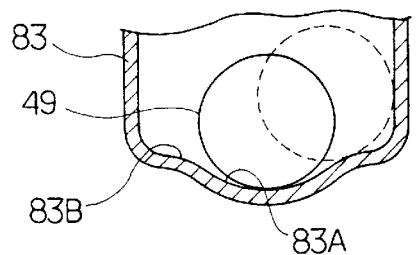
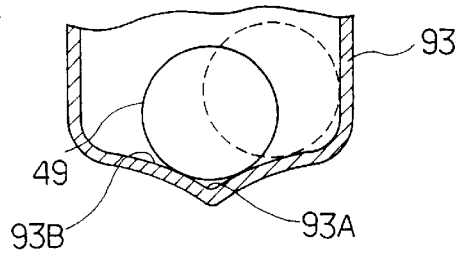
FIG. 24  FIG. 25
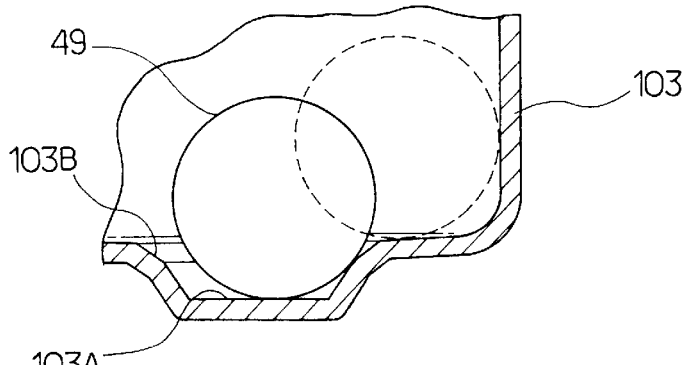
FIG. 26
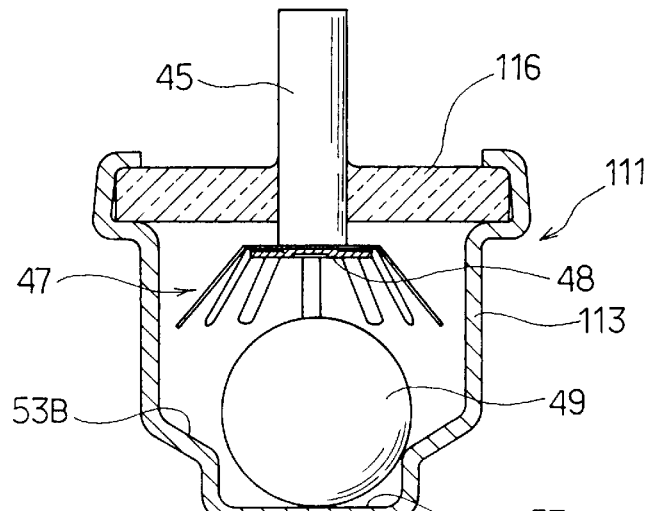
FIG. 27

INERTIA SWITCHING DEVICE, ACCELERATION RESPONSIVE DEVICE AND METHOD OF MAKING ACCELERATION RESPONSIVE DEVICE

This application is a continuation-in-part of Ser. No. 08/121,522, filed Sep. 16, 1993, now abandoned, and Ser. No. 08/310,390, filed Sep. 22, 1994, now U.S. Pat. No. 5,600,109.

BACKGROUND OF THE INVENTION

1. Field of the Invention

This invention relates to an inertia switching device mounted on an automatic shutoff valve having an integrated microcomputer and employed in a city gas equipment and a commercial propane gas equipment or mounted on control devices of oil space heaters, gas burning appliances and electrical equipment, for detecting oscillations such as an earthquake to thereby supply a detection signal to the automatic shutoff valve or the control devices and further relates to a method of making such an acceleration switching device.

2. Description of the Prior Art

The prior art has proposed various types of seismosensitive devices. Japanese Laid-open Patent Application (Kokai) No. 63-29286 (1988), which will be referred to as "first reference," discloses a seismosensitive device wherein a seismosensitive ball drives a first contact in response to an earthquake of a predetermined seismic intensity to cause the same to be engaged with a second contact. The seismosensitive ball is designed to automatically maintain its horizontal state in a casing. Japanese Laid-open Patent Application (Kokai) No. 2-18622 (1990), which will be referred to as "second reference," discloses a seismosensitive device wherein a seismosensitive ball rolls in a receptacle such that a movable contact suspended from over the ball is engaged with and disengaged from a fixed contact disposed in an inner casing. The receptacle is suspended in an outer casing with a liquid filled therein. Japanese Laid-open Patent Application (Kokai) No. 64-79624 (1989), which will be referred to as "third reference," discloses a seismosensitive device wherein a mercury globule is enclosed in a metal receptacle.

The seismosensitive devices have recently been mounted on automatic shutoff valves having an integrated microcomputer and employed in city gas equipments and commercial propane gas equipments. Oscillations due to an earthquake or the like are detected by the seismosensitive device, which thereby generates a detection signal. The signal is supplied to the automatic shutoff valve so that necessary countermeasures are taken. In these valves, the oscillations due to the earthquake need to be distinguished from an oscillation caused by collision of a flying object with the valve and an artificial noise caused by driving of a dump truck or the like, civil engineering works and the like. For this purpose, the seismosensitive device is required to have predetermined operating characteristics in a frequency band of the oscillation due to the earthquake and different operating characteristics in the other frequency band. The above-mentioned first reference discloses nothing about this requirement. More specifically, in the disclosed seismosensitive device, the movable contact is held between the fixed contact and the ball serving only as the driving source of the movable contact when the movable contact is engaged with the fixed contact. Actually, however, the substantial collision of the ball with the fixed contact, both members being rigid bodies, takes place and a resultant repulsion causes the ball and the movable contact to instantaneously depart from the fixed contact. This construction cannot ensure a desirably long contact time period and accordingly, the duration of an "on" signal cannot be rendered long enough when the seismosensitive device serves as a switch. Thus, the oscillation due to the earthquake cannot be distinguished from that due to the artificial noise or electrical noise when the device disclosed in this reference is employed for detecting the oscillations due to the earthquake.

The movable contact is suspended with a point of support slightly higher than the center of gravity of the seismosensitive device disclosed in the above-mentioned second reference, which increases the number of parts and complicates the construction of the seismosensitive device. Consequently, it is difficult to assemble and miniaturize the seismosensitive device. Furthermore, this seismosensitive device cannot provide a long contact time period as in the device of the first reference. The second reference discloses that the repulsion due to the collision of the movable contact with the fixed contact is absorbed by resilient members so that the contact is prevented from being instantaneous. However, this further increases the number of parts and complicates the construction. Although this reference also discloses that the seismosensitive ball can be rendered small since the movable contact is moved with the ball, a friction between the ball and the movable contact prevents the miniaturization of the ball. Additionally, the receptacle enclosing the ball is formed from an insulating material. Where the insulating material is a synthetic resin, organic contaminants which cause failure in electrical conduction between the contacts are apt to be produced. The production cost of the seismosensitive device is increased where the insulating material is a glass or ceramic. Furthermore, the rolling of the ball or the collision thereof with the movable contact deforms, particularly, projected or corner portions of the receptacle when the receptacle is formed from the synthetic resin. Consequently, initial operating characteristics cannot be achieved after some period of service.

The seismosensitive device employing the mercury as disclosed in the third reference is a high-performance switch having characteristics matching with control by means of a microcomputer and providing a stable performance for a long period of time. However, a seismosensitive device wherein the mercury is not employed has recently been desired from a view of protection against environmental contamination.

In view of the foregoing, a small-sized, rigid, cost-effective seismosensitive device suitable for the mass production has been desired. The mercury should not be employed in the seismosensitive device and yet, it should have the same operating characteristics as in those of the seismosensitive device employing the mercury. In this respect, however, the construction of the seismosensitive device employing the mercury globule cannot automatically be applied to the seismosensitive device wherein the solid conductive ball is employed, since the mercury globule is liquid.

SUMMARY OF THE INVENTION

Therefore, a primary object of the present invention is to provide an inertia switching device wherein a stable electrical contact between parts composing a contact pair can be ensured and a desired contact period of time can be stably achieved.

Another object of the invention is to provide an acceleration responsive device wherein the oscillation due to the earthquake can be clearly distinguished from that due to other noise.

Further, another object of the invention is to provide an acceleration responsive device which is rigid, simple in construction and small in size.

To achieve these objects, the invention provides an acceleration responsive device which includes a seismosensitive element. The seismosensitive element comprises a housing formed from an electrically conductive material and having a bottom and an open end, the housing having an inclined face formed on the bottom thereof to gently rise concentrically outwardly substantially from the center of the bottom thereof. A header is fixed to the housing to close the open end thereof and has a through-aperture in which an electrically conductive terminal pin is fixed in an insulated relation with the header. A contact member formed from an electrically conductive material is fixed to an end of the terminal pin located inside the housing. The contact member has a plurality of feather portions including respective contact portions disposed concentrically with the terminal pin, the feather portions having a predetermined elasticity. An inertia ball is enclosed in the housing to be located substantially at the center in the housing in a normal attitude thereof in a stationary state. The inertia ball moves when subjected to oscillations, so that the inertia ball slides on the feather portions of the contact member except for distal ends of the feather portions such that the inertia ball electrically conducts between the contact member and the housing and such that the feather portions are elastically deformed, thereby receiving a force causing the same to be pushed against the bottom of the housing.

According to the above-described seismosensitive element, the inertia ball moves when subjected to the oscillations. The inertia ball slides on the feather portions of the contact member, elastically deforming them, thereby receiving the force pushing it against the housing bottom. This construction stabilizes the contact of the inertia ball with the contact member and the housing bottom. Consequently, the oscillations due to the earthquake can be distinguished from that due to the other noise since the electrical contacting operation can be stabilized and a desired contact duration can be ensured.

Preferably, a bound force based on a resultant force (F2+F3) of a first composite force (F2) of a first frictional force (F1) and a second frictional force (F3) is set to be smaller than a second resultant force (F4+F5) of a composite force (F4) of a repulsive force applied to the inertia ball by the feather portions of the contact member and a third composite force (F5) where the first composite force (F2) acts between the inertia ball and the feather portions in a movable range of the inertia ball in a direction parallel to the bottom of the housing, the second frictional force (F3) acts between the inertia ball and the bottom of the housing, the second composite force (F4) acts in a direction parallel to the bottom of the housing, and the third composite force (F5) is generated by the weight of the inertia ball and acts in the direction parallel to the bottom of the housing.

The invention also provides an acceleration responsive device, suitable for a tilt switch, comprising a housing formed from an electrically conductive material and having a bottom and an open end, the housing having in the bottom a central neutral recess and a rolling face around the recess such that the bottom is formed into the shape of a shelf, a header fixed to the housing to close the open end thereof and having a through-aperture in which an electrically conductive terminal pin is fixed in an insulated relation with the header, a contact member formed from an electrically conductive material and fixed to an end of the terminal pin located inside the housing, the contact member having a contact portion disposed concentrically with the terminal pin, and an inertia ball enclosed in the housing to be located at the recess of the housing bottom in a normal attitude thereof in a stationary state by gravity such that the inertia ball is prevented from being brought into contact with the contact member. The rolling face of the bottom of the housing is formed so that the same rises concentrically outwardly from the center of the bottom thereof and so that a gradient thereof is decreased. The inertia ball is prevented from rolling on the rolling face of the housing bottom by the neutral recess thereof until the housing is tilted by a predetermined angle, thereby being disallowed to come into contact with the contact member. The inertia ball is allowed to depart the neutral recess to thereby roll on the rolling face when the housing is tilted above the predetermined angle, so that the inertia ball is brought into contact with the contact member, thereby electrically connecting the contact member to the housing.

Another object of the present invention is to provide an acceleration responsive switch which can provide an oscillation detection signal on the basis of which oscillations applied thereto can be reliably distinguished between an earthquake and the other disturbing oscillations and to provide a method of making the switch.

Still yet another object of the invention is to provide an acceleration responsive switch wherein a stable operation can be expected even in an environment in which the ambient temperature changes to a large extent and to provide a method of making the switch.

In one aspect, the present invention provides an acceleration response switch comprising a receptacle including a bottomed cylindrical, electrically conductive housing having an inclined face formed on an inner bottom face so as to gently rise concentrically outwardly substantially from a center of the inner bottom face and a header fixed to the housing to close an open end of the housing and having a through-aperture. A lead terminal is fixed in the through-aperture of the header so as to extend through the header and be electrically insulated from the housing. A contact member is secured to an end of the lead terminal located in the housing and includes a plurality of feather portions arranged radially to be approximately concentric with the housing. Each feather portion has a predetermined elasticity. An electrically conductive inertia ball is enclosed in the closed receptacle so as to be capable of rolling on the inner bottom face of the housing. The inertia ball is located substantially at the center of the inner bottom face of the housing in a normal attitude thereof in a stationary state due to the inclined face of the inner bottom face of the housing. The inertia ball moves to a position spaced from the center of the inner bottom face of the housing when subjected to an oscillation, so that the inertia ball contacts one or more of the feather portions of the contact member, thereby electrically conducting between the feather portions and the housing. The invention is characterized by a collision portion formed on a portion of an inner peripheral wall of the housing adjacent which portion the inertia ball rotates, sliding in touch with the feather portions of the contact member. The inertia ball collides against the collision portion while rolling, thereby changing the course of movement thereof.

The header may be hermetically secured to the open end of the housing so that the hermetic receptacle is provided.

According to the above-described acceleration responsive switch, the collision portion prevents the movement of the inertia ball from developing in the housing to an undesirable rotational motion due to the component force intersecting the direction in which the oscillation is applied to the inertia ball. Consequently, since the inertia ball comes into contact with the feather portions of the contact member continuously, rotating, undesirable generation of a continuous "on" signal similar to one generated when the equipment on which the acceleration responsive device is mounted has overturned.

Furthermore, if the movement of the inertia ball should develop to the undesirable rotational motion, the rotational motion would be terminated in a short period of time by the collision of the inertia ball against the collision portion. Consequently, the condition for determination of an earthquake cannot be satisfied by the time length and the number of times of generation of the "on" signal generated during that short period of time.

In a second aspect, the acceleration responsive switch according to the invention is characterized by an oscillation damping liquid contained in the hermetic receptacle with the inertia ball, instead of the above-described collision portion formed on the inner wall of the housing. The oscillation damping liquid has a viscosity suitable to apply resistance to the inertia ball so that the inertia ball ceases rotating when an external oscillation previously applied to the inertia ball stops.

The oscillation damping liquid can also prevent development of the movement of the inertia ball to the undesirable rotational motion and can also terminate the rotational motion of the inertia ball in a short period of time even if the inertia ball should cause the rotational motion.

The oscillation damping liquid preferably contains water the content of which is determined so that electrical conductivity between the housing and the contact member with the inertia ball interposed therebetween is not substantially prevented by freezing of the water. More specifically, the oscillation damping liquid preferably contains a mixture of hydrocarbon as a main liquid and alcohol as an additive liquid or a mixture of a main liquid in which alcohol does not almost dissolve and alcohol added to the main liquid. Furthermore, an amount of oscillation damping liquid poured into the housing may be determined so that the liquid level is in contact with the contact member.

In a third aspect, the invention provides a method of making an acceleration responsive switch comprising the step of obtaining a bottomed cylindrical, electrically conductive housing having an inclined face formed on an inner bottom face so as to gently rise concentrically outwardly substantially from a center of the inner bottom face, the step of obtaining a header fixed to an open end of the housing and having a through-aperture in which a lead terminal is hermetically fixed so as to extend through the header and be insulated from the header, the lead terminal having an end to which a contact member including a plurality of feather portions is secured, the feather portions being arranged radially to be approximately concentric with the housing and each having a predetermined elasticity, the step of enclosing an electrically conductive inertia ball in the housing, and the step of hermetically securing the header to the open end of the housing finally so that the contact member is located in the housing. The method is characterized by the step of pouring an oscillation damping liquid into the housing before the header is secured to the open end of the housing, the oscillation damping liquid having a viscosity suitable to apply resistance to the inertia ball so that the inertia ball ceases rotating when an external oscillation previously applied to the inertia ball stops, and the step of reducing pressure in the interior of the housing accommodating the inertia ball and the oscillation damping liquid therein to a predetermined value and subsequently, filling the housing with a pollution preventing gas, the pressure reducing operation and the operation of filling the housing with the pollution preventing gas being alternately performed once or more times until a predetermined rate of inert gas replacement is reached.

Instead of the above-described step of filling the housing with the pollution preventing gas, the method according to the invention may include the step of causing the pollution preventing gas to flow through the interior of the housing accommodating the inertia ball and the oscillation damping liquid therein until the predetermined rate of inert gas replacement is reached.

In a fourth aspect, the method according to the invention is characterized by the step of reducing pressure in the interior of the housing accommodating the inertia ball therein to a predetermined value and subsequently, filling the interior of the housing with a pollution preventing gas before securement of the header to the open end of the housing until a predetermined rate of inert gas replacement is reached, and the step of pouring an oscillation damping liquid into the housing subsequently to the step of filling the interior of the housing with the pollution preventing gas before securement of the header to the open end of the housing, the oscillation damping liquid having a viscosity suitable to apply resistance to the inertia ball so that the inertia ball ceases rotating when an external oscillation previously applied to the inertia ball stops.

Other objects of the present invention will become obvious upon understanding of the illustrative embodiments about to be described with reference to the accompanying drawings. Various advantages not referred to herein will occur to those skilled in the art upon employment of the invention in practice.

BRIEF DESCRIPTION OF THE DRAWINGS

Several embodiments of the present invention will be described with reference to the accompanying drawings, in which:

FIG. 5 is a longitudinally sectional front view of a seismosensitive device incorporated with the seismosensitive element;

FIG. 6 is a longitudinally sectional side view of the seismosensitive device;

FIG. 7 is a longitudinally sectional view of the seismosensitive element of a second embodiment;

FIG. 8 is a longitudinally sectional view of the seismosensitive element of a third embodiment;

FIG. 9 is a longitudinally sectional view of the seismosensitive element of a fourth embodiment;

FIGS. 24, 25 and 26 are view of modified forms of a housing of the tilt switch, respectively;

FIG. 27 is a longitudinally sectional view of the tilt switch of an eleventh embodiment;

DETAILED DESCRIPTION OF THE PREFERRED EMBODIMENTS

Figure 1:
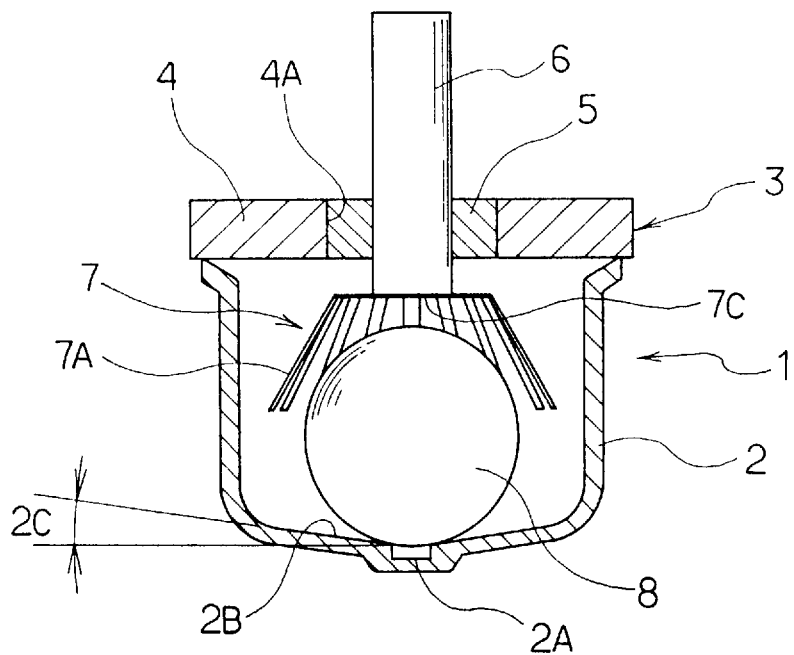
FIG. 1 is a longitudinal sectional view of a seismosensitive element of a first embodiment in accordance with the invention.

The first embodiment of the invention will now be described with reference to FIGS. 1 to 6. FIG. 1 illustrates a seismosensitive element 1 employed in a seismosensitive device in accordance with the present invention. The seismosensitive element 1 comprises a housing 2 and a header 3 each formed from an electrically conductive material such as a metal. The housing 2 is formed into a cylindrical shape and has an open end and a bottom. The header 3 has an aperture 4A formed therethrough. An electrically conductive terminal pin 6 is fixed in the aperture 4A by an electrically insulative filler 5 such as glass or ceramic so as to extend therethrough. A contact plate 7 serving as a fixed contact is secured on one end of the terminal pin 6 located in the housing 2, by way of welding or the like. The contact plate 7 has a plurality of feather portions 7A radially extending from its center and each having a sufficient elasticity. An electrically conductive solid inertia ball 8 serving as a movable contact is enclosed in the housing 2. The inertia ball 8 may be formed from iron, stainless steel, copper, its alloy and hard lead. In this regard, the iron, copper and the like are easily oxidized in an atmospheric air and accordingly, there is a possibility that a resultant oxide film may spoil the electrical conductivity of the inertia ball 8. It is preferable that the surface of the inertia ball be treated with a noble metal such as gold or silver or by plating nickel or an alloy of lead and tin. The header 3 is secured to the housing 2 by way of ring projection so as to close the open end thereof.

Air in the hermetically sealed housing 2 is discharged and instead, the housing 2 is filled by a volume of contamination preventive gas such as hydrogen, helium, argon or nitrogen so that the contact plate 7, the inertia ball 8 and the inner face of the housing 2 can be protected against corrosion and contamination, which results in achievement of stable operating characteristics for a long period of service.

The bottom 2B of the housing 2 includes an inclined face. The inclined face is a conical face obtained by turning a straight line with an inclination 2C in the embodiment. The shape of the inclined face should not be limited to this. For example, it may be a conical face whose inclination is varied en route. Furthermore, it may be a concave or convex face obtained by turning a curve with a vertically smooth curvature. The above-described inclination is defined as an angle of a straight line between a contact point of the inertia ball on the inclined face at a stationary position thereof and a contact point of the inertia ball on the inclined face at a position assumed by the inertia ball when it has rolled farthest. The curvature of each above-mentioned curve may be varied en route or gradually unless its direction of inclination changes.

The bottom face 2B of the housing 2 is provided with a central recess 2A serving as a rest portion for holding the inertia ball 8 in position until it is subject to an oscillation with a predetermined magnitude. Without the rest portion, the inertia ball would tend to roll in response even to a slight oscillation, which would instabilize the operating characteristics of the element near its responsive threshold and would cause chattering between the contacts. The size of the recess 2A depends upon the diameter of the inertia ball 8 and a predetermined oscillational acceleration to which the element responds. The oscillational acceleration α (threshold value) which causes the inertia ball 8 to start rolling is obtained from the following equation (1):

$$\alpha = \frac{r \cdot g}{\sqrt{R^2 - r^2}} \qquad (1)$$

where R is a radius of the inertia ball 8 and r is a radius of the recess 2A.

For example, consider now the case where the seismosensitive element is designed to be responsive to the earthquake of Seismic intensity 5. In this case, the oscillational acceleration causing the inertia ball 8 to start rolling is obtained as approximately 100 gal from the above equation (1) when the radius R of the inertia ball 8 is 3 mm and the radius r of the recess 2A serving as the rest portion is 0.3 mm. The oscillational acceleration is approximately 250 gal when the inertia ball radius R is 3 mm and the recess radius r is 0.75 mm. A range defined by these values of the oscillational acceleration corresponds approximately to a range of oscillational acceleration between 80 and 250 gal at Seismic intensity 5. Accordingly, the oscillational acceleration causing the inertia ball 8 to start rolling can be set in the range corresponding to Seismic intensity 5 when the radius of the rest portion takes a value 0.1 to 0.25 times smaller than the radius of the inertia ball 8.

The operation of the seismosensitive element 1 will be described. The inertia ball 8 rests on the recess 2A when it is stationary at its normal attitude. In this state, the inertia ball 8 is positioned apart from the contact plate 7 and accordingly, the terminal pin 6 is not electrically connected to the housing 2 or the metal header 3. When subjected to an oscillation, the inertia ball 8 is kept resting on the recess 2A until the predetermined oscillational acceleration intensity value depending upon the radii of the inertia ball and the recess is reached. When the predetermined oscillational acceleration intensity value is reached, the inertia ball 8 is caused to move out of the recess 2A, rolling on the bottom face 2B of the housing 2. Rolling on the bottom face 2B, the inertia ball 8 comes into contact with the feather portions 7A of the contact plate 7. Consequently, an electrical path is made by the terminal pin 6, the contact plate 7, the inertia ball 8, the housing 2 and the header 3. A resultant electrical signal is supplied to various warning devices or control devices so that a protective device such as the automatic shutoff valve or the control device of the gas burning appliance is operated to thereby prevent occurrence of fire due to the earthquake.

The oscillations due to the earthquake need to be distinguished from the other oscillations or disturbing oscillations for prevention of unnecessary operation of the protective device when the above-described seismosensitive element is incorporated in the automatic shutoff valve employed in the city gas equipment or the commercial propane gas equipment. The oscillations due to the earthquake have waveforms in a vast range of cycle. Sinusoidal wave oscillations ranging between 0.3 and 0.7 seconds of cycle is usually employed as an alternative characteristic. When the range of the responsive threshold of the seismosensitive element is between 130 and 190 gal, which range corresponds to that of the earthquake of Seismic intensity 5, the sinusoidal oscillations of the cycle ranging between 0.3 and 0.7 seconds is applied to the seismosensitive element, which sinusoidal oscillation takes a responsive range value in a range of acceleration corresponding to the range of the threshold. For example, consider a case where a microcomputer is arranged to determine that an earthquake has occurred, under the condition that "on" and "off" signals each having a period of 40 milliseconds or above are delivered three cycles or above within three seconds. The signal generated by the seismosensitive element needs to be in accord with the above-mentioned condition in order that the microcomputer determines an occurrence of the earthquake when the above-described sinusoidal oscillation is applied to the seismosensitive element and the protective device such as the automatic shutoff valve is operated.

The elasticity of the contact plate 7 and the angle 7B of the feather portion 7A are important factors for determination of the "on" and "off" periods of the signal in the seismosensitive element of the embodiment. For example, consider the case where the contact plate 7 is formed from a phosphor bronze plate to have a thickness of 0.05 mm, a length of 4 mm and each feather portion's width of 0.5 mm and the inertia ball 8 is formed from a steel ball of approximately 0.7 gram with the nickel plating applied thereto. In this case, when the angle 7B of each feather portion 7A with respect to the bottom face 2B is 90 degrees and the feather portions 7A are disposed around the ball 8 concentrically therewith, the inertia ball 8 is caused to bound immediately upon contact with the feather portion 7A and hops up and down against the housing bottom face 2B. Consequently, a sufficient duration of contact of the inertia ball 8 with the feather portions 7A cannot be obtained. Thus, a necessary "on" period cannot be obtained even when the sinusoidal oscillations taking the above-mentioned responsive range value is applied to the seismosensitive element in the predetermined cycle. Furthermore, since the "on" period is short, it is difficult to discriminate the operating characteristic of the element from that in the case where the sinusoidal oscillations are applied in a cycle shorter than the predetermined one. Additionally, the oscillations cannot be distinguished from electrical noise. The above-described phenomena becomes more conspicuous as the contact plate 7 has a large spring constant. It can be understood that when the inertia ball 8 rolls in response to the oscillations into contact with the feather portions 7A, as shown by dotted line, in FIG. 2, a function for maintaining the contact state needs to be provided by the angle 7B of the feather portion 7A with respect to the housing bottom face 2B.

When brought into contact with the feather portions 7A with some pressure, the angle 7B causes the inertia ball 8 to receive a composite force pushing it against the housing bottom face 2B. Sliding on the feather portions 7A, the inertia ball 8 is braked by the composite force in the condition that it is held between the feather portions 7A. Consequently, when the angle 7B is less than 90 degrees, the "on" period can be rendered longer as compared with that when the angle 7B is 90 degrees. Furthermore, since the inertia ball 8 is held between the feather portions 7A and the bottom face 2B of the housing 2 with a predetermined force, the state of the inertia ball 8 in contact with the feather portions 7A and the bottom face 2A can be rendered stable. Additionally, since the inertia ball 8 is brought into contact with the feather portions 7A and the housing bottom face 2B, sliding thereon, the contact surface of the inertia ball 8 can be kept clean, which prevents occurrence of failure in contact.

Accordingly, the angle 7B between the inertia ball 8 and the housing bottom face 2B is set at a value less than 90 degrees when the inertia ball 8 is brought into contact with the feather portions 7A. That is, the inertia ball 8 is interposed between the feather portions 7A of the contact plate 7 and the housing bottom face 2B, as a wedge is inserted. Consequently, the inertia ball 8 is pushed by the feather portions 7A against the housing bottom face 2B, which stabilizes the inertia ball 8 in the contact state. Furthermore, the electrical contact resistance can be stabilized since the inertia ball 8 is brought into contact with the feather portions 7A and the housing bottom face 2B, sliding thereon such that a braking effect is obtained.

In the present invention, the amount of deflection of each feather portion 7A of the contact plate 7 is set to be ranged between 0.25 and 5 mm when a force corresponding to the weight of the inertia ball 8 is applied to one feather portion 7A at the contact point therebetween. This setting of the amount of deflection of the feather portion 7A can obtain a suitable value for a composite force exerted upon the inertia ball 8 by the contact plate 7 to cause it to be pushed against the housing bottom face 2B when the inertia ball 8 is in contact with the contact plate 7. This setting can also obtain a suitable value for a composite force returning the inertia ball 8 toward the center of the housing 2. Furthermore, this setting can obtain a suitable value of the duration for contact between the inertia ball 8 and the feather portions 7A.

The following facts were confirmed in an experiment in which a steel inertia ball having the diameter of 5.5 mm and the weight of 0.7 gram was used as the inertia ball 8. That is, the amount of deflection of the contact plate in the case of collision of the inertia ball thereagainst is slight when each feather portion has the width of 0.5 mm and the thickness of 0.06 mm or above. The "on" period is rendered shorter than the "off" period since the inertia ball is rebounded from the feather portions. In addition, the inertia ball cannot precisely follow the oscillations set therein since its movement is disturbed when it rebounds from the feather portions. Furthermore, even when the angle 7B of the feather portion 7A with respect to the housing bottom face 2B is set at 90 degrees or below, it is difficult to cause the braking effect resulting from a force holding the inertia ball between the feather portions and the housing bottom face and the sliding movement of the inertia ball, since the amount of deflection of each feather portion is small. In this case, the "on" period of the signal is not so much increased as compared with that in the case where the angle 7B is 90 degrees.

In the case where the diameter of the inertia ball is above 5.5 mm, the waveforms of the "on" and "off" signals can be suitable for the condition of determination by the microcomputer even when the thickness of each feather portion takes a value of 0.06 mm or above. However, the inner diameter of the housing is limited when a small-sized seismosensitive device is produced. Under the circumstances, when the diameter of the inertia ball is increased, the distance of movement of the inertia ball is reduced, which cannot provide a sufficient "off" period. Thus, increasing the inertia ball diameter as described above is not adequate.

Figure 3:
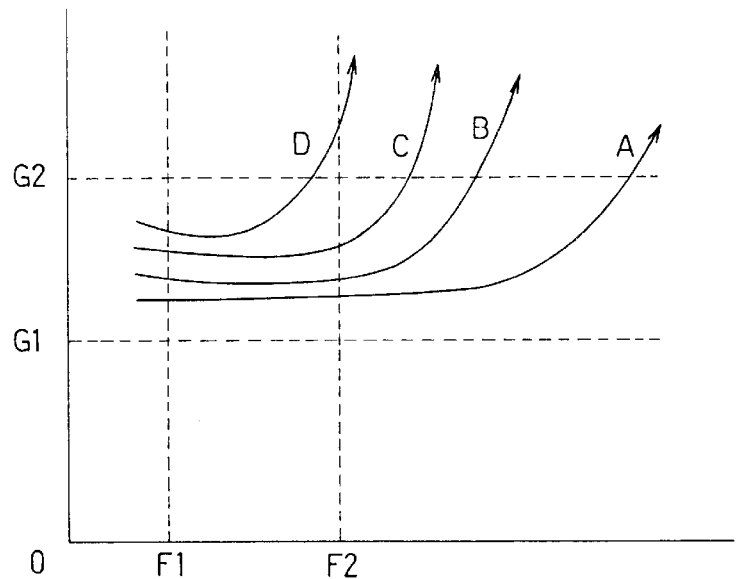
FIG. 3 is a graph showing operating characteristics of the seismosensitive element.

FIG. 3 shows the relationship between the inclination 2C of the housing bottom face 2B and accelerations by frequencies, based on which the microcomputer determines that an earthquake has occurred. The microcomputer is designed to determine that the earthquake has occurred, under the condition that "on" and "off" signals each having a period of 40 milliseconds or above are delivered three cycles or above within three seconds, as described above. In FIG. 3, oscillational frequencies F1 and F2 are 1.43 and 3.3 Hz, respectively and oscillational accelerations G1 and G2 are 130 and 190 gal, respectively. Curves A to D show the characteristics in the case of different inclinations 2C of the housing bottom face 2B. Curve A shows the case where the inclination 2C of the housing bottom face 2B is less than 2 degrees, curve B shows the case where the inclination 2C is 3 degrees, curve C shows the case where the inclination is 6 degrees and curve D shows the case where the inclination is 11 degrees. It can be understood from FIG. 3 that the seismosensitive element operates even in a high frequency range when the inclination 2C is small, which shows that the element operates in response to so-called noise due to disturbing oscillations. Furthermore, when the inclination 2C is large, malfunction of the element in the high frequency range can be prevented while the responsiveness of the element is lowered in the low frequency range. Thus, the response characteristic of the seismosensitive element is lowered when the inclination 2C is large, and additionally, the oscillational acceleration to which the seismosensitive element responds in the low frequency range is increased.

In view of the foregoing, the inclination 2C of the housing bottom face 2B is set in the range between 4 and 10 degrees and the inner diameter of the housing 2 is so set that an addition of it and the diameter of the inertia ball 8 is within 4 mm, in the embodiment. Consequently, the inertia ball 8 can be prevented from hopping vertically against the horizontal oscillation and the amount of resistance thereof in the rolling can be reduced even when a smaller inertia ball is used so that the size of the seismosensitive element is reduced. Thus, stable contact between the inertia ball and the contact plate and the housing bottom face can be achieved.

Furthermore, in the case where the inclination 2C of the housing bottom face 2B is 3 degrees or less, the rolling friction can prevent the inertia ball 8 from returning to the center in the housing, if the seismosensitive element 1 is inclined one or two degrees relative to the normal attitude when installed. Accordingly, a high installation accuracy is required when the seismosensitive element is installed. Furthermore, a composite force acts on the inertia ball 8 to push it against the housing bottom face 2B while the inertia ball 8 is rolling in response to the oscillational acceleration. The contact between the inertia ball 8 and the housing bottom face 2B is unstable since this composite force is insufficient. Consequently, the chattering can occur when the inertia ball 8 is brought into contact with the feather portions 7A. Furthermore, when the inclination 2C exceeds 10 degrees, a sufficient composite force pushing the inertia ball 8 against the housing bottom 2B can be obtained, which stabilizes the contact between the inertia ball 8 and the housing bottom face 2B. In this case, however, the amount of resistance the inertia ball 8 suffers while rolling is increased, which reduces the distance by which the inertia ball 8 rolls and the distance by which the inertia ball 8 moves, sliding on the feather portions 7A. The duration of contact between the inertia ball 8 and the feather portions 7A also becomes insufficient. Consequently, the ratio of the "on" period to the "off" period becomes large, which makes it difficult to cause the output signal to correspond to the determination criterion programmed in the microcomputer.

The inner diameter of the housing 2 is determined as follows. The major frequency of the earthquake ranges between 1 and 5 Hz. The sinusoidal oscillation having the frequency in the above-described range as the alternative characteristics is applied to the seismosensitive element in a characteristics test. A stable output signal can be obtained when the inertia ball rolls on the housing bottom face by the maximum distance of 2 mm from the center thereof. Provision of more distance will result in redundance and increases the size of the seismosensitive element.

For example, the amplitude of 6 mm is applied to the seismosensitive element when the oscillations having the frequency of 2 Hz are applied to the seismosensitive element and the acceleration is 100 gal which is approximately its lower limit value in the case of the earthquake of Seismic intensity 5. When the inertia ball is set to start rolling at 100 gal and its distance of movement is set to a value of 2 mm or below from the center thereof, the inertia ball is reliably brought into contact with the contact plate since it rolls to its maximum movement position.

Furthermore, the amplitude is about 2.5 mm when the oscillational frequency is 5 Hz and the acceleration is 250 gal which is approximately its upper most value in the case of the earthquake of Seismic intensity 5. In this case, too, the inertia ball is brought into contact with the contact plate. Actually, however, the necessary distance of movement of the inertia ball 8 is 2 mm in its response to the normal oscillation since the magnitude of movement of the inertia ball is reduced by its contact with the contact plate and its sliding movement. A more distance movement of the inertia ball is not necessary. On the contrary, when the distance of movement of the inertia ball is set at a value larger than necessary, the seismosensitive element is subjected to a relatively large impact acceleration during transportation such that the inertia ball is caused to move to collide with the inside of the housing. In this case, the angle 7B between the contact plate and the inertia ball is reduced and a resistance force due to friction induced by the inertia ball pushed against the housing bottom becomes larger than a restoring force resulting from the weight of the inertia ball and a repulsive force of the contact plate. Consequently, there is a high possibility that the inertia ball is held between the housing bottom and the contact plate, so that the inertia ball cannot be returned to its normal position even when the seismosensitive element is returned to its normal position.

As obvious from the foregoing, the maximum distance of movement of the inertia ball 8 can be defined by determining the inner diameter of the housing 2. Accordingly, the distance of movement of the inertia ball 8 in the case where the seismosensitive element is subjected to the abnormal impact acceleration can be rendered approximately the same as that due to normal oscillations. Consequently, the angle 7B can be prevented from being unnecessarily reduced, which enhances the return of the inertia ball 8 under the action of its weight and the repulsive force of the contact plate 7.

The amplitude is about 1 mm when the oscillational frequency is 5 Hz and the acceleration is 100 gal. In this case, the "on" and "off" signals are reliably generated when the distance between the inertia ball 8 and the feather portions 7A is set at a value not larger than the amplitude. For example, when the upper limit frequency is 5 Hz, each of the "on" and "off" signals is theoretically generated ten times for one minute. The signal cycle is 50 milliseconds if the "on" period is as long as the "off" period. However, since the operating period of time of the seismosensitive element varies actually, there is a possibility that the frequency of 5 Hz or below cannot be detected when the microcomputer is so programmed that the determination threshold value is 50 milliseconds. Accordingly, each of the "on" and "off" time periods are set to 40 milliseconds or above in the invention so that the variations in the operating time period are allowed. In this case, the microcomputer is arranged not to determine that an earthquake has occurred, when the oscillational frequency is 6.25 Hz or above.

Based on the above-described factors, the microcomputer is programmed and the distance between the inertia ball and the contact plate, the spring constant of the feather portion of the contact plate, the inclination of the housing bottom face and the like are determined.

The following problem can be encountered when the vertical distance between the contact plate 7 and the inertia ball 8 is short. That is, under the condition that a portion of the feather portion 7A with which the inertia ball 8 comes in contact is not changed, the length of the feather portion 7A is rendered shorter in the case where the above-mentioned vertical distance is short than in the case where it is long. When the length of the feather portion 7A is reduced, its spring constant is increased and an angular change of the feather portion 7A relative to the amount of movement of the inertia ball 8 is increased. Accordingly, the mass of the inertia ball 8 needs to be increased or the spring constant of the feather portions 7A of the contact plate needs to be reduced. Furthermore, the contact angle of the inertia ball 8 with respect to the feather portion 7A is unnecessarily decreased when the inertia ball 8 moves to be adjacent to the inner face of the housing 2, since the angular change of the feather portion 7A is large. Accordingly, there is a possibility that the resistive force due to the friction may become larger than the returning force of the inertia ball 8 due to the repulsive force of the feather portion 7A.

In view of the foregoing, the vertical distance between the inertia ball 8 and the contact plate 7 is determined to be five percent of the diameter of the inertia ball 8 or above. This determination provides the contact plate of a desired performance without use of the contact plate formed of an unnecessarily thin material or formed into an unnecessarily slender construction or without use of the inertia ball of a large mass. For example, when the used inertia ball 8 has the diameter of 5 mm and the vertical distance between the inertia ball 8 and the content plate 7 is 0.5 mm, the "on" and "off" time periods are stable under the condition that the portion of the feather portion 7A with which the inertia ball 8 comes in contact is not changed. However, both of the "on" and "off" time periods become uneven when the vertical distance is 0.2 mm. The reason for this is that the spring constant of the feather portion of the contact plate is increased, as described above. Furthermore, in the present invention, the allowable error at the time of assembly need not be rendered smaller than necessary, which simplifies the assembly.

The sinusoidal waves are employed as the alternative characteristics in the characteristics test of the seismosensitive element as described above, since it is difficult to reproduce the oscillation of an actual earthquake. Accordingly, the acceleration varies largely in the actual earthquake although it varies relatively smoothly in the characteristic test. Accordingly, there is a possibility that when the seismosensitive element is subjected to a particularly large oscillation or impact acceleration, the inertia ball 8 may enter deep between the feather portions 7A and the housing bottom face 2B to be held therebetween if the frictional force acting between the inertia ball 8 and the feather portions 7A is large. In this case, the self-weight and the repulsive force of the feather portions 7A cannot return the inertia ball 8 to its former position when it becomes stationary with the disappearance of the oscillations and accordingly, the electrical path cannot be opened.

To overcome the above-described drawback, the seismosensitive element of the invention is constructed so that a first resultant force (F2+F3) is smaller than a second resultant force (F4+F5) in the movable range of the inertia ball where F2 is a composite force of a frictional force F1 between the inertia ball 8 and the feather portion 7A, the first composite force F2 acting in a direction parallel to the housing bottom, F3 is a second frictional force between the inertia ball and the housing bottom, F4 is a second composite force of a repulsive force applied to the inertia ball by the feather portion, the second composite force F4 acting in a direction parallel to the housing bottom, and F5 is a third composite force due to the weight of the inertia ball, the third composite force F5 acting in a direction parallel to the housing bottom.

Figure 2:
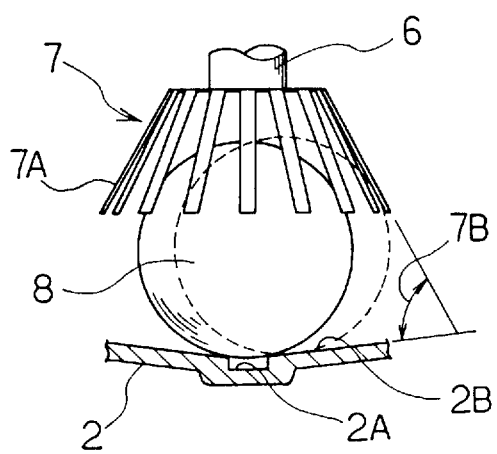
FIG. 2 is a partially enlarged sectional view of the seismosensitive element.
Figure 4:
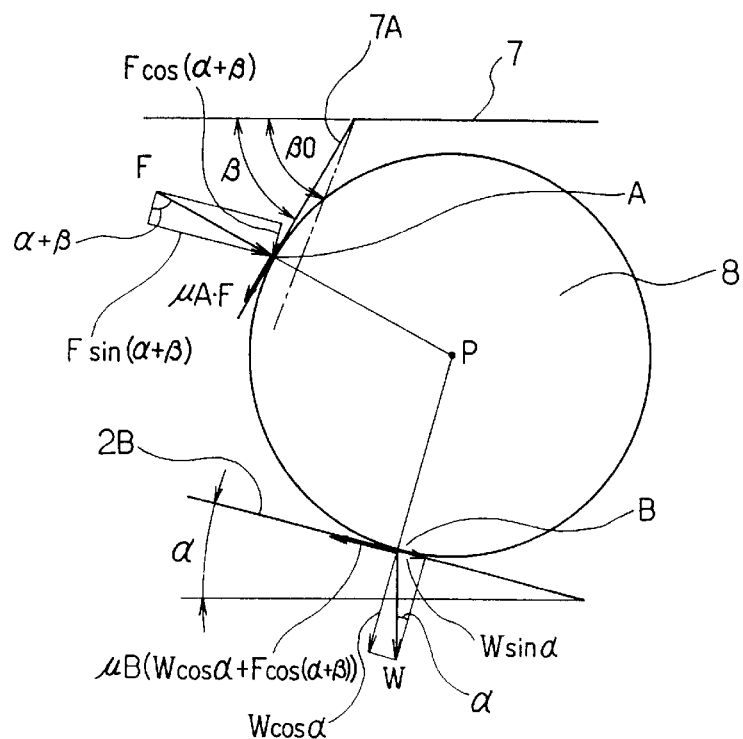
FIG. 4 is a schematic diagram for explaining the operation of the seismosensitive element.

In the above-described construction, the inertia ball 8 can be prevented from being held between the feather portion 7A and the housing bottom and can be allowed to return to the former position, no matter what position the inertia ball may assume within its movable range. Consequently, the electric path can be opened reliably. This will be further described with reference to FIG. 4. FIG. 4 shows a vector representation of the forces acting on the inertia ball 8 of the seismosensitive element employed in the seismosensitive device. In FIG. 4, reference symbol F designates the repulsive force applied to the inertia ball by the feather portion, W the weight of the inertia ball, P the center of the inertia ball, α the inclination between the housing bottom face and a tangent touching the inertia ball, β an inclination between the feather portion and a horizontal plane where $\beta \geq 0$, $\mu A$ a friction factor at a contact point between the inertia ball and the feather portion, and $\mu B$ a friction factor at a contact point between the inertia ball and the housing bottom face. The above-mentioned inclination α is an inclination of the tangent at the point of contact between the inertia ball and the housing bottom face. The inclination α agrees with the inclination 7B when the housing bottom face is conical as shown in FIG. 2. However, it does not necessarily agree with the inclination 7B when the housing bottom face has the other configurations. In order that the inertia ball 8 returns to the former position on the recess 2A when the seismosensitive element has rested in the normal attitude, the following expression needs to be satisfied:

$$F \cdot \sin(\alpha+\beta) + W \cdot \sin \alpha > \mu A \cdot F \cdot \cos(\alpha+\beta) + \mu B \cdot (W \cdot \cos \alpha + F \cdot \cos(\alpha+\beta)) \quad (2)$$

where $\alpha+\beta \geq 90°$.

Describing the expression (2), the left side of the expression shows the returning force causing the inertia ball 8 to move to the right along the housing bottom face 2B, as viewed in FIG. 4. Its right side shows the frictional force causing the inertia ball 8 to remain in position. The inertia ball 8 starts to move when the force shown by the left side of the expression is above that of the right side while it remains in position when the force shown by the right side of the expression is above that of the left side.

The left side of the expression (2) includes a term representative of the returning force due to the repulsive force F and a term representative of the returning force due to the weight W of the inertia ball 8. More specifically, the term, $F \cdot \sin(\alpha+\beta)$, represents a composite force of the repulsive force F acting in the direction parallel to the housing bottom face 2B or the returning force. The term, $W \cdot \sin \alpha$, represents a composite force of the weight of the inertia ball 8 acting in the direction parallel to the housing bottom face 2B or the returning force.

The right side of the expression (2) includes a term representative of a composite force of the frictional force resulting from the repulsive force of the feather portion 7A and the friction at the point of contact between the feather portion 7A and the inertia ball 8, which point of contact will be referred to as "contact point A." The right side of the expression further includes a term representative of the frictional force resulting from the force pushing the inertia ball 8 against the housing bottom face 2B and the friction at a point of contact between the inertia ball 8 and the housing bottom face 2B, which point of contact will be referred to as "contact point B." The term, $\mu A \cdot F$, represents the frictional force acting at the contact point A. The term, $\mu A \cdot F \cdot \cos(\alpha+\beta)$, represents the composite force acting in the direction parallel to the housing bottom face 2B. The inertia ball 8 is pushed against the housing bottom face 2B by a resultant force of the composite force of the weight of the inertia ball 8 acting vertically on the housing bottom face 2B and represented by the term, $W \cdot \cos \alpha$, and the composite force of the repulsive force F acting vertically on the housing bottom face 2B and represented by the term, $F \cdot \cos(\alpha+\beta)$. This resultant force causes the frictional force represented by the term, $\mu B(W \cdot \cos \alpha + F \cdot \cos(\alpha+\beta))$.

Either the frictional force $\mu A_0 \cdot F$ due to the sliding friction at the contact point A or the frictional force $\mu B_0 (W \cdot \cos \alpha + F \cdot \cos(\alpha+\beta))$ lower than the other causes the inertia ball 8 to slide, and the other frictional force does not cause the inertia ball to slide. Consequently, the inertia ball is caused to roll. For example, consider the case where the weight of the inertia ball 8 is 0.69 gram when $\alpha=6°$, the angle $\beta_0$ between the feather portion in the free state without no elastic deformation by the inertia ball and the inertia ball at the contact point is 55°, the angle β between the feather portion and the housing bottom face at the position where the inertia ball engages the housing bottom face is 40°, and the repulsive force F is 0.6 gram. Under these conditions, the frictional force at the contact point B overcomes the frictional force at the contact point A and accordingly, the inertia ball slides on the feather portion and rolls along the housing bottom face. Consequently, it can be understood that friction factor $\mu A$ at the contact point of the feather portion and the inertia ball, which factor is represented in the right side of expression (2) is a static frictional resistance factor under the above-mentioned conditions and that the friction factor $\mu B$ at the contact point B of the inertia ball and the housing bottom face is a rolling friction factor under the above-mentioned conditions.

Generally, the friction factor depends upon the material and the surface condition. Consider now the case where the sliding friction factor between the inertia ball and the feather portion or between the inertia ball and the housing bottom face is 1.0 and the rolling friction factor between the inertia ball and the feather portion or between the inertia ball and the housing bottom face is 0.001. When these values are applied to the expression (2), it holds even where the inertia ball is positioned at a position where it engages the housing bottom face in the seismosensitive element under the above-described conditions. Thus, it can be understood that the weight of the inertia ball and the repulsive force of the feather portion cause the inertia ball to roll.

There is a possibility that roughness of the surfaces of the inertia ball, feather portion and housing bottom face and minute cracks on these surfaces may increase the above-mentioned values. In such a case, the inertia ball would be restricted between the housing bottom face and the feather portions after it has rolled, and consequently, the inertia ball could not return to the former position. However, actually, the spring rate of the feather portion and the like are so set that the inertia ball is prevented from engaging the inner wall of the housing in the above-described seismosensitive element when it is subjected to the normal oscillational acceleration. Even when the element is subjected to an impulse acceleration larger than the normal oscillational acceleration, for example, reaction is caused at the position where the inertia ball engages the housing inner wall is to be considered.

However, the inertia ball easily moves to engage the housing inner wall when the free angle $\beta_0$ of the feather portion is small. Consequently, the inertia ball would be restricted by the frictional force when the friction factor is large. Furthermore, the distal end of the feather portion touches the inertia ball or the housing inner wall when the free angle $\beta_0$ is excessively large, and consequently, the electrical path would not be opened.

In view of the foregoing, the free angle $\beta_0$ is determined to range between 45° and 75° and $\alpha+\beta \geq 40°$ where α is the inclination of the tangent at the point of contact between the inertia ball and the housing bottom face when the inertia ball engages the housing bottom face and the housing inner wall simultaneously and β is the inclination of the feather portion with respect to the horizontal plane where $\alpha \geq 0$ and $\beta \geq 0$. The inertia ball can be prevented from being restricted between the feather portions and the housing bottom face when the angles of the feather portion 7A in its free state and in its state of the maximum elastic deformation are set as described above.

In order that $\alpha+\beta \geq 40°$ when $\beta_0$ is set at 40° or below, the repulsive force for the return of the inertia ball cannot be obtained since the elastic deformation of the contact plate by the inertia ball cannot be obtained. Consequently, the spring rate of the contact plate needs to be increased in this case. Furthermore, the variations in the duration of contact of the inertia ball is increased since the distance that the inertia ball moves sliding on the contact plate is reduced. Furthermore, the degree of freedom in selection of the length of the feather portion is reduced in order that the distal end of the feather portion is prevented from touching the inertia ball or the housing inner side wall $\beta_0$ is set at 75° or above. That is, the distal end of the feather portion engages the inner side wall of the housing before the inertia ball engages it, when the length of the feather portion is set at a so large value that the contact point of the contact plate with the inertia ball is not positioned on the distal end of the feather portion. On the other hand, the distal end of the feather portion engages the inertia ball when the feather portion is rendered short so that the distal end of the feather portion is prevented from touching the housing inner side wall. Accordingly, the dimensional tolerance and the erection tolerance of the feather portion as a part are narrowed, which requires high accuracy in the production of the part.

Additionally, when the value of $\alpha+\beta$ is 40° or less the force pushing the inertia ball against the housing bottom face, which force is a composite force of the repulsive force of the feather portion against the inertia ball, is increased when the inertia ball engages the housing inner side wall. The frictional force acting on the inertia ball overcomes the return force of the inertia ball and accordingly, the inertia ball is restricted between the contact plate and the housing bottom face.

In view of the foregoing, when the inclination $\beta_0$ of the feather portion with respect to the horizontal plane is set at a value below 75°, as described above, the distance that the inertia ball moves sliding on the contact plate can be prevented from being shortened and a sufficient setting of the dimensions of the feather portion can be ensured, which renders the assembly easy. Furthermore, the inertia ball can return to the central portion of the housing by the action of the its self-weight and the feather portion of the contact plate even when the inertia ball occupies the position where it engages the housing inner side wall.

FIGS. 5 and 6 illustrate the above-described seismosensitive element enclosed in a resin casing 12 holding the element in its normal attitude. An electrically conductive L-shaped pin 13 is welded on the header 4 of the seismosensitive element 1. The seismosensitive element 1 is inserted into the casing 12 through its underside opening. The terminal pin 6 and the pin 13 are inserted through apertures 12A and 12B formed in the casing 12, respectively. The header 4 is engaged with a projected attitude maintaining portion 12C formed in the inside of the casing 12 so that the seismosensitive element 1 is positioned. In this condition, terminals 14 and 15 are welded to the ends of the terminal pin 6 and the pin 13 projecting from an upper wall of the casing 12, respectively, such that the seismosensitive element 1 is fixed to the casing 12.

In order that the seismosensitive device 11 is mounted on a kerosene fan space warmer, for example, the bottom face 12D of the casing 12 is closely attached to a bottom plate of the space warmer or the like and then, screws are inserted into respective fixing apertures 12E to be driven home so that the seismosensitive device is fixed.

FIG. 7 illustrates a second embodiment of the invention. In the second embodiment, a protector 9 having a high stiffness is provided in the vicinity of the portion of the contact plate 7 secured to the terminal pin 6 so that a permanent deformation of the contact plate 7 due to the collision of the inertia ball 8 therewith can be prevented. The protector 9 is formed of a steel plate having a thickness several times larger than that of the contact plate 7 or more. An angle 9B of a circumferential edge portion 9A of the protector 9 is set to a value as large as or smaller than the angle 7B of the contact plate 7. The protector 9 is bent outward as it goes to its end so that its end can be prevented from striking the inertia ball 8. The dotted line in FIG. 7 shows the position of the inertia ball 8 when the seismosensitive element is subjected to the oscillational acceleration. As obvious from this position of the inertia ball 8, the protector 9 is mounted not to obstruct the normal movement of the inertia ball 8 and the normal elastic deformation of the feather portions 7A of the contact plate 7 when the seismosensitive element is subjected to the normal oscillational acceleration under the condition of its normal use.

The contact plate 7 would be held between the inertia ball 8 and the protector 9 when the seismosensitive element is subjected to a large acceleration such as the impact acceleration. However, the shape of the protector 9 is determined so that the deformation of the contact plate 7 does not exceed its range of elastic deformation when the contact plate 7 is held between the protector 9 and the inertia ball 8. Furthermore, the protector 9 is so formed as not to have any corners holding the contact plate 7 with the inertia ball 8. Thus, permanent deformation of the contact plate is prevented.

FIG. 8 illustrates a third embodiment of the invention. In the third embodiment, a protector 10 is provided between the contact plate 7 and the inertia ball 8 so that the contact plate 7 can avoid being held between the inertia ball 8 and the protector 10. The protector 10 is not brought into contact with the inertia ball 8 during its rolling on the housing bottom face 2B under the condition that the seismosensitive element 1 is subjected to the normal acceleration in its normal use, as shown by dotted line in FIG. 8.

The inertia ball 8 collides with the protector 10 when the seismosensitive element is subjected to the impact acceleration or the like such that the inertia ball 8 moves upwards, as viewed in FIG. 8. In this case, the direct collision of the contact plate 7 with the inertia ball 8 can be avoided as in the second embodiment, whereby the permanent deformation of the contact plate 7 can be prevented.

FIG. 9 illustrates a fourth embodiment. In the seismosensitive element 16, the housing 2 enclosing the electrically conductive inertia ball 8 is closed by the header 3 in the same manner as in the first embodiment such that the closed housing is provided. The angle between the housing bottom face 2B and the feather portion 17A of the contact plate 17 serving as the contact portion with the inertia ball 8 is approximately 90 degrees. The length of the feather portion 17A is determined so that its distal end is located lower than the plane passing the center of the inertia ball 8.

The amount of deflection of the feather portion 17A is set so as to be ranged between 0.25 and 5 mm when the force corresponding to the weight of the inertia ball 8 is applied to one feather portion 17A at the contact point of the feather portion and the inertia ball, as described above. This setting of the amount of deflection of the feather portion 17A can allow the feather portion 17A to deflect and provide a stable signal. When the amount of deflection of the feather portion 17A is below 0.25 mm, the time period of contact of the feather portion 17A and the inertia ball 8 becomes too short and the signal becomes unstable. When the amount of deflection exceeds 5 mm, the contact time period becomes too long, which makes it difficult to distinguish the frequency-dependent change in the rate of "on" and "off" periods.

In the embodiment, however, the feather portion 17A deflects when the inertia ball 8 collides therewith, as is shown by dotted line in FIG. 9. The inertia ball 8 is decelerated by the deflection of the feather portion 17A. Furthermore, since the feather portion 17A is inclined outward upon collision of the inertia ball 8 therewith, the composite force pushing the inertia ball 8 against the housing bottom face 2B is applied to the inertia ball in the same manner as the case where the feather portion is originally formed so as to be inclined outward, as shown in FIG. 1 and accordingly, the inertia ball 8 is decelerated by its sliding movement.

Figure 10:
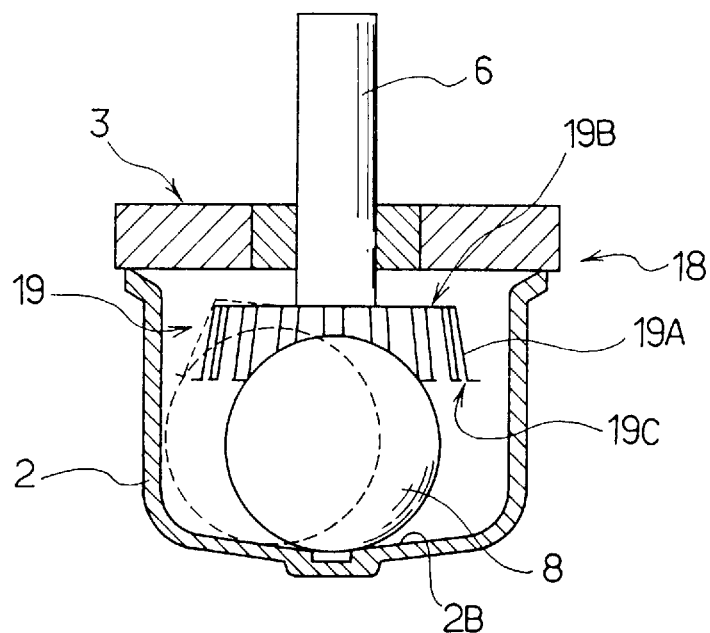
FIG. 10 is a longitudinally sectional view of the seismosensitive element of a fifth embodiment.
Figure 11:
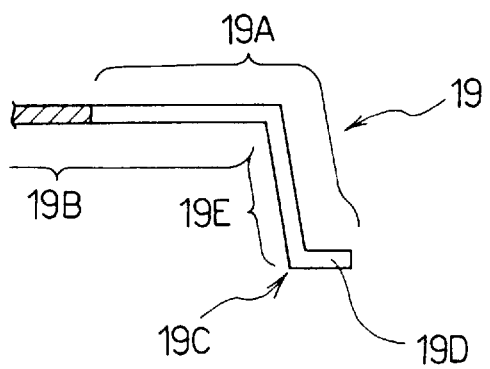
FIG. 11 is a partially enlarged view of a contact plate employed in the seismosensitive element of the fifth embodiment.

FIGS. 10 and 11 illustrate a fifth embodiment. In the seismosensitive element 18, too, the housing 2 enclosing the electrically conductive inertia ball 8 is closed by the header 3 in the same manner as in the foregoing embodiments such that the closed housing is provided. A contact plate 19 secured to the distal end of the terminal pin 6 includes feather portions 19A starting with a horizontal portion 19B. A downwardly bent portion 19E has a distal end 19C adapted to be located higher than the center of the inertia ball 8. It is preferable that the angle between the feather portion 19A and the housing bottom face 2B be 90 degrees or below. A bent portion 19D of the feather portion 19A is provided for avoiding intrusion of the feather portion 19A into the inertia ball 8 at the time of engagement.

In the fourth embodiment shown in FIG. 9, a force acting so that the inertia ball 8 is taken up by the feather portions 17A is produced when the spring rate of the feather portion 17A is high and the angle between the feather portion 17A and the housing bottom face 2B and 90 degrees or more. Consequently, the contact of the inertia ball 8 with the housing bottom face 2B becomes unstable.

In the fifth embodiment, however, the distal end 19C of the feather portion 19A is located higher than the center of the inertia ball 8. As compared with the construction in which the distal end of the feather portion is not located higher than the center of the inertia ball, the distance of movement of the inertia ball moving until it engages the feather portion 19A is increased, as obvious from ball shown by the inertia ball shown by dotted line in FIG. 10. Consequently, the diameter of the contact plate can be reduced relative to the inertia ball 8 and accordingly, the seismosensitive element can be rendered small-sized. Furthermore, since the feather portion engages the inertia ball at its portion above its center and the feather portion 19A starts with its horizontal portion 19B, the contact plate 19 deflects upwards upon its engagement with the inertia ball regardless of the angle between the feather portion and the housing bottom face. Consequently, the force pushing the inertia ball 8 against the housing bottom face 2B is produced and stabilizes the contact between the inertia ball 8 and the housing bottom face 2B. Furthermore, since the inertia ball 8 engages the feather portion 19A at the portion thereof above its center, the force acting so that the inertia ball 8 is taken up by the feather portions 19A is not produced even when the angle of the feather portion 19A with respect to the housing bottom face 2B is 90 degrees or above. Consequently, the contact between the inertia ball 8 and the housing bottom face 2B can be stabilized even when the bending angle of the feather portion 19A is 90 degrees or more.

Figure 12:
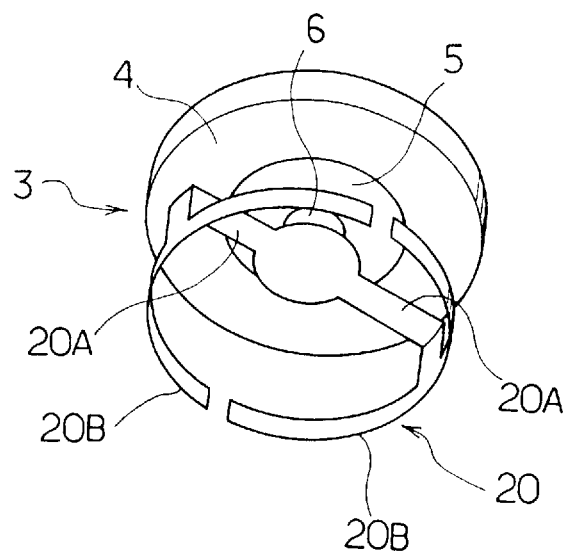
FIG. 12 is a partial perspective view of the seismosensitive element of a sixth embodiment.

FIG. 12 illustrates a sixth embodiment. The contact plate 20 of the seismosensitive element is formed of a thin metal plate. The contact plate 20 has two feather portions 20A extending from its portion secured to the terminal pin 6. Each feather portion 20A has an arc-shaped contact portion 20B at its extended end. The contact portions 20B are arranged to circularly surround the inertia ball 8. Accordingly, the inertia ball 8 is brought into contact with the circular contact portions 20B when the seismosensitive element is subjected to the acceleration.

Figure 13:
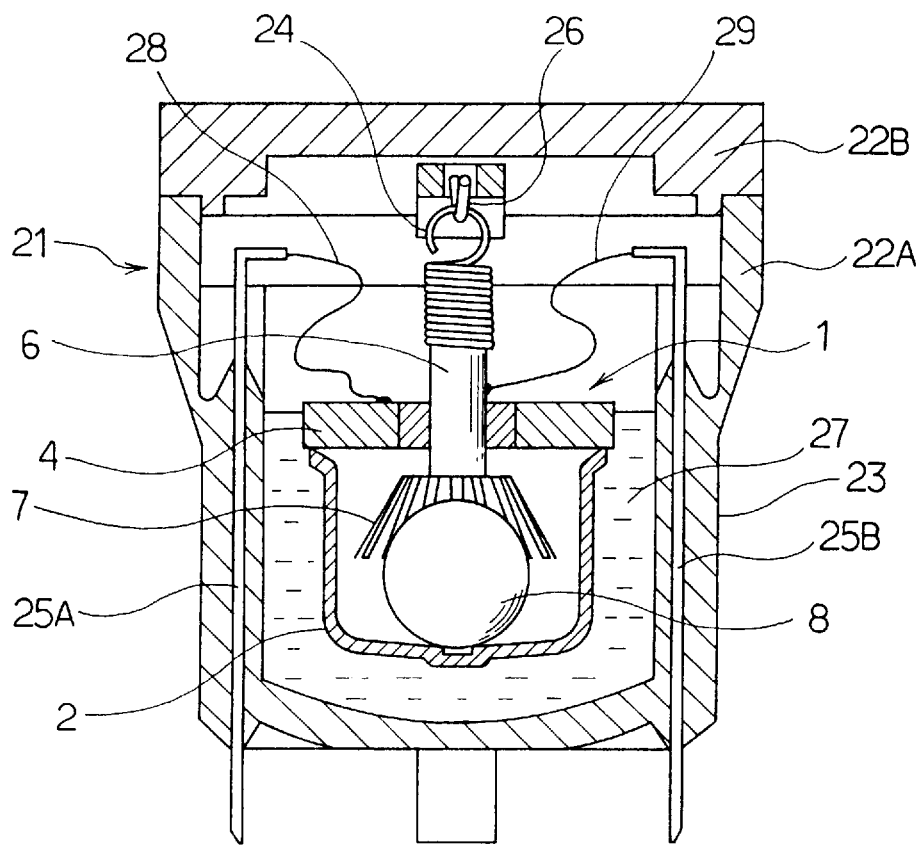
FIG. 13 is a longitudinally sectional view of the seismosensitive device of a seventh embodiment.

FIG. 13 illustrates a seventh embodiment. The seismosensitive device 21 comprises a casing 23 including a receptacle 22A formed of a resin and a header 22B secured to the receptacle 22A by way of ultrasonic welding and the seismosensitive element 1 enclosed in the casing 23. A hook 24 serving as a hanging portion is secured to the terminal pin 6. The casing 23 serves to hold the seismosensitive element 1 in its normal attitude. Terminals 25A and 25B are secured to the receptacle 22A by way of insert molding for electrically connecting between the inside of the casing 23 and the outside thereof. An end of the hook 24 is hung on a support 26 provided in the receptacle 22A so that the seismosensitive element 1 is rockably supported and that the gravity causes the seismosensitive element 1 to assume its normal position.

An amount of a liquid 27 having a selected viscosity, such as silicon oil, is enclosed in the receptacle 22A. A lead wire 28 is connected at one end to the metal plate 4 which is at the same potential as the housing 2 of the seismosensitive element 1 and is further connected at the other end to the terminal 25A. Another lead wire 29 is connected at one end to the terminal pin 6 which is at the same potential as the contact plate 7 and is further connected to the terminal 25B.

The operation of the seismosensitive device 21 will be described. A high level of accuracy is required in mounting the seismosensitive device 11 shown in FIGS. 5, 6. For example, the operating value of the seismosensitive device is reduced about 20 gal when it is mounted only with an inclination of 1 degree. In the seventh embodiment, however, the seismosensitive element 1 is rockably supported on the support 26, so that the position of the seismosensitive element 1 is automatically compensated by the gravity such that the element assumes its normal position, when the mounting angle thereof is within an allowable inclination or within a spare space in which the element 1 can assume the normal position in the space of the casing 23. The viscosity of the liquid 27 is selected so that the seismosensitive element 1 assumes its normal position within a predetermined time period, for example 20 seconds, after the casing 23 is inclined.

When the seismosensitive element 1 mounted as described above is subjected to the oscillations or acceleration, the seismosensitive element 1 is responsive, integrally with the casing 23, to the oscillations with a cycle of 2 to 3 seconds, for example, since the liquid 27 with the selected viscosity is enclosed in the casing 23, which can provide reliable detection.

The seismosensitive device has recently been mounted on a gas meter with an automatic shutoff valve for city gas or commercial propane gas equipment. The body of a person passing by the gas meter or a thing carried by him or her may strike the gas meter or a ball for a ball game may strike the gas meter since the gas meter is usually located outdoors. In such a case, there is a possibility that the seismosensitive element is subjected to noise oscillations. An experiment performed by the inventors shows that an oscillational acceleration of the sinusoidal waveform is applied to the gas meter when the gas meter is subjected to a disturbing oscillation as described above. In this case, the oscillational acceleration reduces from about 1,000 gal in the period of about 0.1 second, though the period differs more or less because of the interval of the support positions of metal fixtures. Assume now that the threshold of the seismosensitive device is set at 150 gal and that the microcomputer is programmed so that it determines that an earthquake has occurred, when the "on" and "off" signals each having the period of 40 milliseconds are generated in three cycles or more within three seconds. In this case, the period of the "on" and "off" signals does not reach 40 milliseconds even when the seismosensitive element generates the "on" and "off" signals each having a period of 25 milliseconds. Consequently, the microcomputer does not determine that an earthquake has occurred.

The seismosensitive device is turned on when an equipment on which the seismosensitive device is mounted overturns or inclines upon occurrence of an earthquake before the seismosensitive device responds to the oscillational acceleration. When the on-state continues for one second or more, the same determination is made as that in the case where an earthquake having a predetermined acceleration is detected. When the inclination is, for example, 5 degrees in accordance with the spare space in the casing 23, the seismosensitive element 1 quickly assumes its normal position and the inclined state of the seismosensitive device cannot be detected when the liquid 27 is not enclosed in the casing 23. When the liquid 27 is enclosed in the casing 23, the seismosensitive element 1 is braked by the viscosity of the liquid 27 such that the seismosensitive element 1 gradually returns to its normal position within the predetermined period of time, for example, within 20 seconds upon sudden inclination of the seismosensitive device. Since the "on" period of the signal becomes one second or above, the microcomputer can determine that the equipment on which the seismosensitive device is mounted has been inclined. Consequently, a warning can be given or controlled equipment can be controlled.

Figure 14:
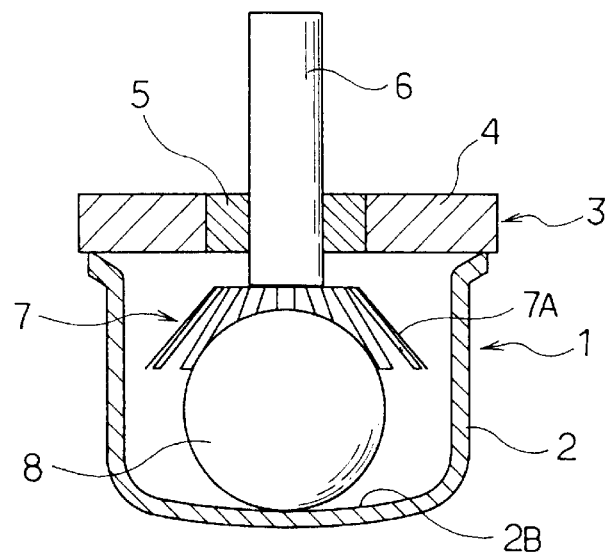
FIG. 14 is a longitudinally sectional view of a modified form of the seismosensitive element of the first embodiment shown in FIG. 1.

In each of the foregoing embodiments, the recess 2A is provided as the rest portion for the inertia ball in the bottom of the housing of the seismosensitive element. However, the rest portion may be eliminated depending upon the working condition of the seismosensitive element, as shown in FIG. 14.

Figure 15:
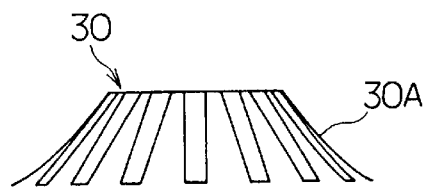
FIGS. 15, 16 and 17 are views of modified forms of the contact plate employed in the seismosensitive element, respectively.
Figures 16, 17:
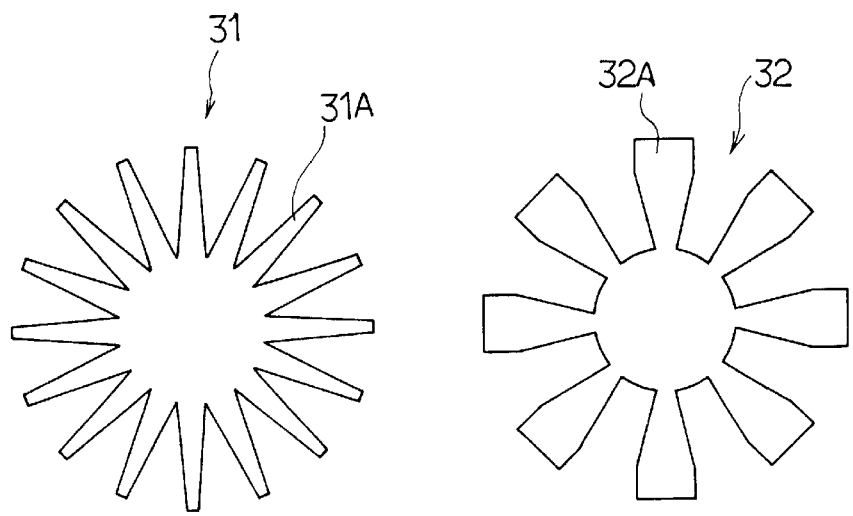

FIGS. 15 to 17 illustrate modified forms of the contact plate. In the contact plate 30 shown in FIG. 15, each feather portion 30A has a distal end curved outward. In the contact plate 31 shown in FIG. 16, each feather portion 31A has a larger width at its root portion than at any other portion thereof since the stress concentrates on the root portion. In the contact plate 32 shown in FIG. 17, each feather portion 32A has a larger width at its distal end than at any other portion thereof so that the contact between the inertia ball and the contact plate is stabilized.

Figure 18:
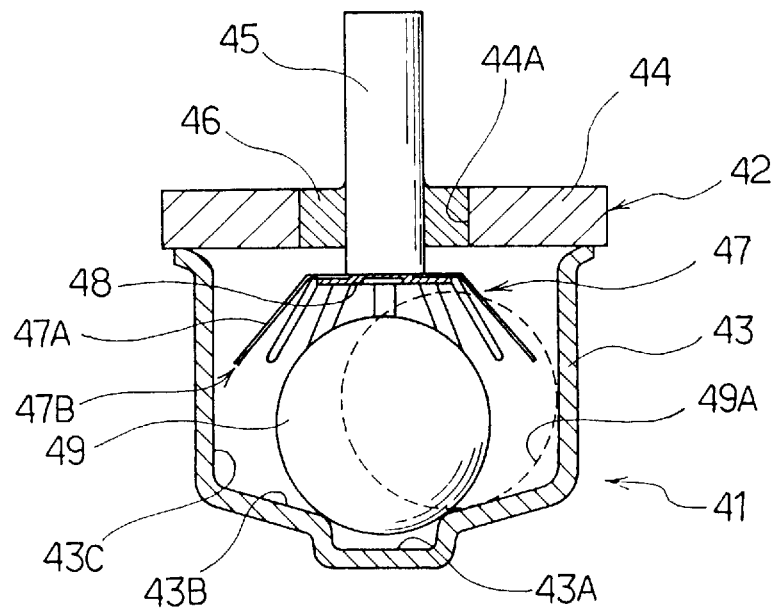
FIG. 18 is a longitudinally sectional view of a tilt switch in accordance with an eighth embodiment.
Figure 19:
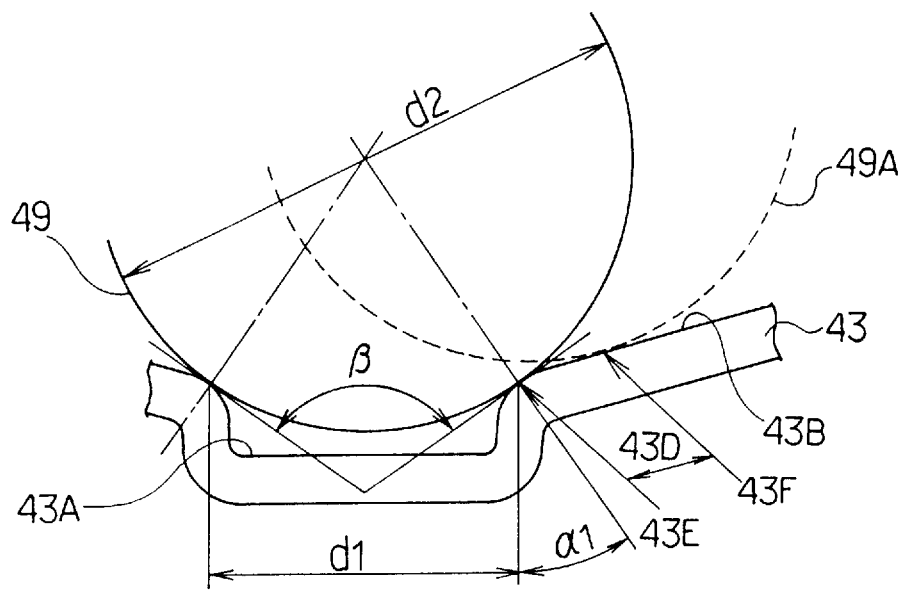
FIG. 19 is a partially enlarged view of a neutral recess of the tilt switch on which an inertia ball rests.

FIGS. 18 and 19 illustrate an eighth embodiment. The invention is applied to a tilt switch in the eighth embodiment. A tilt switch 41 comprises a housing 43 and a header 42 welded to the housing 43. The header 42 is formed of a substantially circular metal plate 44 and has a through aperture 44A formed in its central portion. The conductive terminal pin 45 is inserted through the aperture 44A to be secured therein by the electrically insulative filler 46 such as glass or ceramic.

The contact plate 47 formed of the electrically conductive material is welded to the distal end of the terminal pin 45 at the housing interior side. The contact plate 47 is disposed substantially concentrically with the terminal pin 45. The contact plate 47 has a plurality of feather portions 47A with a sufficient elasticity. When the contact plate 47 is formed from phosphor bronze and a conductive ball has the mass of 0.7 gram, a suitable thickness of the contact plate 47 is in the range of 0.01 to 0.03 mm and a suitable width of each feather portion 47A is approximately 0.5 mm. A protector 48 formed of a metal having a high rigidity is secured to the side of the contact plate 47 opposite that secured to the terminal pin 45 for the purpose of preventing the permanent deformation of the contact plate 47 due to collision of the conductive ball 49 therewith.

The housing 43 is formed of a conductive material such as a metal into a cylindrical shape and has a bottom. A neutral position holding portion or a neutral recess is formed in the central portion of the bottom of the housing 43. The bottom of the housing 43 has a neutral position holding portion or a neutral recess 43A formed in the central portion thereof and a rolling face 43B around the neutral recess 43A such that the housing bottom is formed into the shape of a shelf. The rolling face 43B is formed in an inclined face rising radially from the central portion. The portion of the inclined face on which the conductive ball rolls has a larger inclination at the radially central side and a smaller inclination at the outer side such that the inclination varies continuously or uncontinuously. The solid conductive ball 49 formed of a metal or the like is provided in the housing so as to be positioned at the central neutral recess 43A by the action of the gravity while the tilt switch assumes its normal position and the conductive ball 49 is at rest.

The operation of the tilt switch 41 will now be described. A set operating angle of the tilt switch 41 depends upon a contact angle α1 between the conductive ball 49 and an open edge 43E of the recess 43A. The contact angle α1 depends upon the diameter d1 of the contact portion between the conductive ball 49 and the open edge 43E and the diameter d2 of the conductive ball 49. The contact angle α1 is 35 degrees in the embodiment. When the tilt switch 41 assumes the normal position, the conductive ball 49 is held at the open edge 43E of the neutral recess 43A where it is not in contact with the contact plate 47 and the protector 48 and it is not electrically conducted.

The conductive ball 49 is held at the open edge 43E of the neutral recess 43A until its inclination reaches the set operating angle even when the tilt switch 41 tilts. The conductive ball 49 starts rolling when its inclination exceeds an operating contact angle, 35 degrees in the embodiment. Since the inclination of the rolling face 43B continuous from the open edge 43E is varied as described above, the inclination of the rolling face 43B relative to the horizontal face is decreased as the rolling face 43B goes radially from the center when the set operating angle has been reached. Accordingly, the conductive ball 49 rapidly moves along the rolling face 43B radially to the position shown by dotted line in FIG. 18 when it once starts rolling. When reaching the position 49A, the conductive ball 49 is brought into contact with the feather portions 47A of the contact plate 47, thereby closing an electrical path between the housing 43 and the terminal pin 45. The conductive ball 49 is stabilized at the neutral recess 43A with the open edge 43E when the tilt switch assumes the normal attitude and further stabilized at a position 43F where the inclination of the rolling face 43B relative to the horizontal face is rapidly decreased, when the tilt switch is tilted by the set operating angle. The conductive ball 49 is not stabilized at any position on the rolling face 43D between these points. Accordingly, the switching from the contact to the disengagement between the conductive ball 49 and the contact plate 47 is caused while the conductive ball 49 is rolling between the above-described two points, so that the conductive ball 49 rapidly passes the switching point even when the controlled equipment is slowly tilted. Consequently, an unstable contact state due to unsteady movement of the conductive ball 49 near the set operating angle of the tilt switch can be prevented, which ensures a reliable "on" signal.

Should both of the conductive ball 49 and the contact plate 47 be rigid bodies, these members would repulse each other upon contact of the conductive ball 49 with the contact plate 47. Consequently, chattering is caused between the conductive ball 49 and the contact plate 47. This poses a problem in the actual use of the tilt switch. In the present invention, however, the conductive ball 49 comes into contact with the feather portions 47A each having the sufficient elasticity sliding thereon, so that kinetic energy of the conductive ball 49 is absorbed by the contact plate 47. Consequently, the chattering due to the repulsion between the conductive ball 49 and the contact plate 47 can be prevented. According to experiments performed by the inventors, it takes no less than one milliseconds for the "off" state to completely shift to the "on" state when the conductive ball 49 has a mass of 0.7 gram and a phosphor bronze plate used for the feather portions of the contact plate 47 has a thickness of 0.015 mm and a width of 0.5 mm. On the other hand, several milliseconds are required when the contact plate has a thickness of 0.2 mm and accordingly has high rigidity.

The contact of the conductive ball 49 with the contact plate 47 is maintained until a set return angle is reached. The conductive ball 49 starts rolling again when the angle of the tilt switch exceeds the set return angle. In contrast with the "on" operation, the inclination of the rolling face 43B relative to the horizontal plane is decreased as the rolling face 43B goes to the center of the housing bottom. Accordingly, the conductive ball 49 rapidly returns to the neutral recess 43A and it reliably gets out contact with the contact plate 47, returning to its initial state at an irreversible point.

In the construction that the conductive ball 49 is held on the open edge 43E of the recess 43A without contact with the bottom of the recess 43A, as described above, a hold angle β between the open edge 43E and the conductive ball 49 needs to be an acute angle when a large operating angle is set. However, it can be considered that the conductive ball 49 is held by the open edge 43E when the hold angle β exceeds a predetermined value and that variations in the angle at which the conductive ball 49 starts rolling are caused or the conductive ball 49 becomes inoperative. The tilt switch shown as a ninth embodiment in FIGS. 20 and 21 solves this problem.

Figure 20:
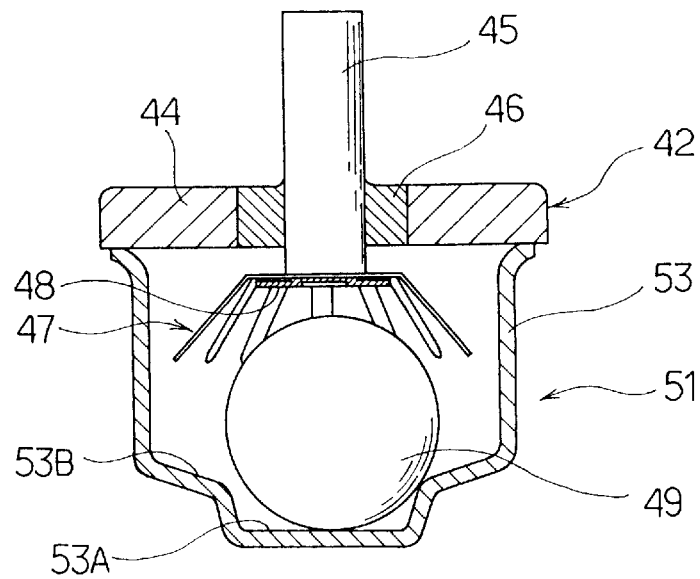
FIG. 20 is a longitudinally sectional view of the tilt switch of a ninth embodiment.
Figure 21:
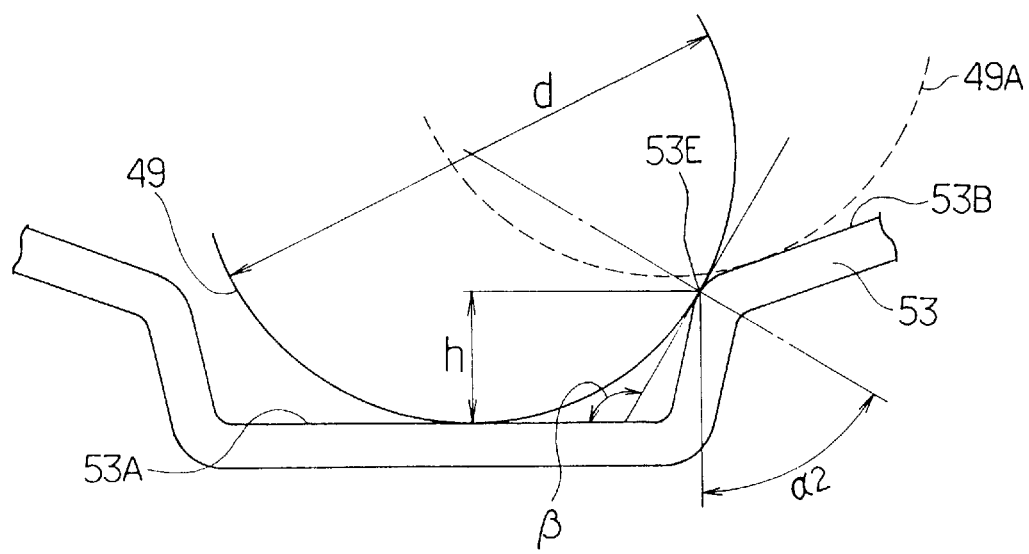
FIG. 21 is a partially enlarged view of the neutral recess of the tilt switch on which the inertia ball rests, in the ninth embodiment.

In the tilt switch 51 shown in FIGS. 20 and 21, the neutral recess 53A is formed so that the conductive ball 49 cannot come into contact with the whole open edge 53E of the recess 53A at once and it rockably abuts against the inner bottom of the recess 53A.

The operation of the tilt switch 51 will be described. Referring to FIG. 21, the operation angle of the switch 51 depends upon the contact angle α2 of the conductive ball at the contact point of the open edge 53E with the conductive ball 49 where the reference symbol h refers to the height from the bottom of the neutral recess 53A to the contact point of the open edge 53E with the conductive ball 49. The contact angle α2 depends upon the diameter d of the conductive ball 49. In the embodiment, the contact angle α2 is 65 degrees when the tilt switch assumes the normal position. When the tilt switch is in the normal position, the conductive ball 49 can roll so far as it is in contact with the bottom of the recess 53A. Furthermore, the distance of free movement of the conductive ball 49 is set so that it is not brought into contact with the contact plate 47 or the protector 48.

Upon tilt of the tilt switch 51, the gravity causes the conductive ball 49 to move into the neutral recess 53A such that it comes into contact with a portion of the open edge 53E. The conductive ball 49 remains in this position until the inclination of the tilt switch 51 reaches the set operating angle. When the inclination of the tilt switch 51 exceeds the set operating angle, the conductive ball 49 gets over the open edge 53E of the neutral recess 53A and then, rapidly moves on the rolling face 53B to the position shown by the dotted line in FIG. 21, whereby the conductive ball 49 comes into contact with the contact plate 47 to close the electrical path between the housing 53 and the terminal pin 45. Accordingly, the unstable contact state due to unsteady movement of the conductive ball 49 near the set operating angle of the tilt switch can be prevented as in the above-described tilt switch 41 and provision of a reliable "on" signal can be ensured.

Furthermore, a gap is reserved between the conductive ball 49 and the open edge 53E of the neutral recess 53A when it occupies the central portion of the bottom of the neutral recess 53A while the tilt switch is in its normal position. Consequently, the hold angle β between the conductive ball 49 and the open edge 53E is increased in the tilt switch 51 as compared with the switch 41 which is set at the same operating angle with of the switch 51 and wherein the conductive ball 49 is restricted by the whole open edge 53E of the neutral recess 53A. Thus, the restricting force against the conductive ball 49 is reduced, which can maintain the stable operating angle. Additionally, the conductive ball 49 can be prevented from being held in the recess 53A since the hold angle β is large even in the tilt switch having a large operating angle.

In the tilt switches as far as described above, the conductive ball rests on the substantially central portion of the contact plate 7 out of contact with the housing when the tilt switch is tilted 180 degrees relative to the normal position or is turned upside down. Consequently, there is a possibility that the "on" signal cannot be generated even when the controlled equipment is turned over.

Figure 22:
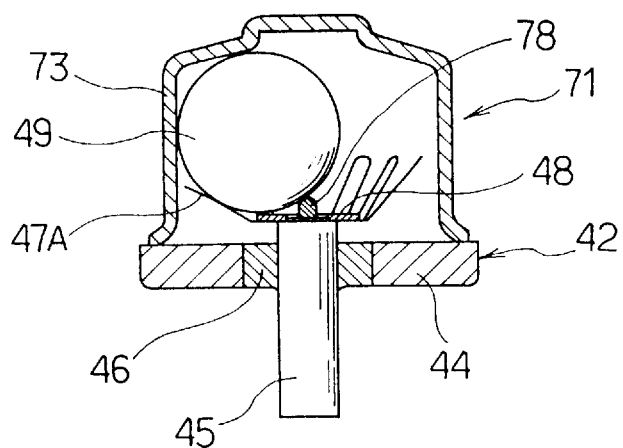
FIG. 22 is a longitudinally sectional view of the tilt switch of a tenth embodiment in its inverted state.
Figure 23:
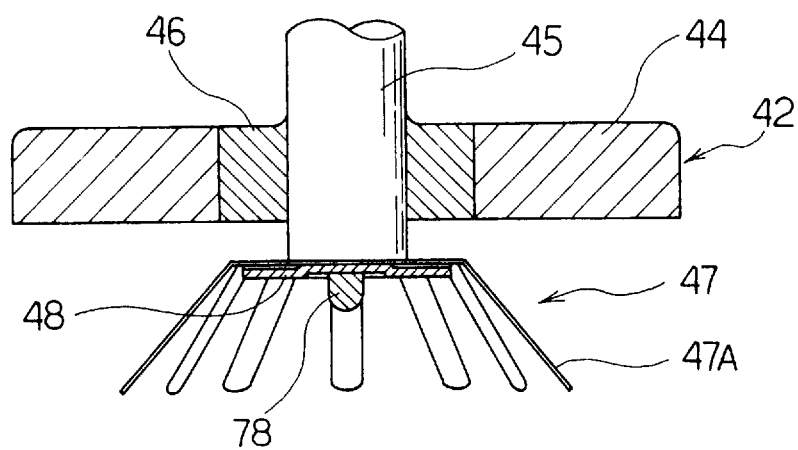
FIG. 23 is a partially enlarged view of the tilt switch, showing a header having a terminal pin to one of which ends the contact plate is fixed.

A tenth embodiment shown in FIGS. 22 and 23 is directed to a solution of the above-described problem. A projection 78 is secured on the central portion of the protector 48, as shown in FIG. 23. The dimensions of the projection 78 are set so that it does not engage the conductive ball 49 when it is at rest while the tilt switch is in its normal position and when it normally rolls. The projection 78 may be formed integrally with the contact plate 47 or the protector 48.

The tilt switch 71 provided with the projection 78 operates in the same manner as the above-described tilt switches, when it assumes its normal position and when it is normally tilted or turned over. When the housing of the tilt switch 71 is turned upside down, the conductive ball 49 undergoes, from the projection 78, a composite force acting outwards from the center such that the conductive ball 49 moves onto the feather portions 47A of the contact plate 47 and comes into contact with the inner wall of the housing 73. Consequently, the "on" signal can be reliably generated even when the switch housing is turned upside down.

In the foregoing embodiments, the conductive ball is prevented from rolling by the open edge of the neutral recess until the inclination of the tilt switch reaches the predetermined angle. The shape of the housing bottom may be deformed into those shown in FIGS. 24 to 26, provided that the conductive ball comes into contact with the contact plate until the operating angle of the tilt switch is reached. The bottom of the housing 83 shown in FIG. 24 has a concave curved face with a radius of curvature larger than that of the conductive ball 49, and the rolling face 83B continuous from the concave curved face is formed into a convex curved face with a radius of curvature larger than that of the conductive ball 49.

FIG. 25 shows the neutral recess 93A having a bottom formed into a conical face. In FIG. 26, a linear face is provided discontinuously between the neutral recess 103A and the rolling face.

FIG. 27 illustrates an eleventh embodiment of the invention. In the tilt switch 111 shown in FIG. 27, the header 116 of the housing 113 is formed from an electrically insulating material and the terminal pin 45 is directly secured in the aperture of the header 116. In this construction, the terminal pin 45 is directly secured in the header 116 in substantially the electrically insulative state. Furthermore, since the housing 113 is formed from the metal and the inorganic electrically conductive material such as glass or ceramics, occurrence of an organic contaminant causing failure in electrical conduction between the contacts can be prevented as compared with the case where the housing formed from a synthetic resin. Additionally, the housing 113 is more rigid and cost-effective than that formed only from the glass or ceramic.

In detection of an earthquake, oscillations due to the earthquake need to be distinguished from the oscillations caused by collision of a flying object with the gas flowmeter or an artificial noise caused by driving of a dump truck or the like or under construction. For this purpose, the seismosensitive element is required to have predetermined signal output characteristics in a frequency band of the oscillation due to the earthquake and different signal output characteristics in the other frequency band.

The quake of an earthquake includes a multiple of oscillations with different frequencies. In most cases, the quake accompanies mainly an oscillation whose frequency is 10 Hz or below and more particularly, the oscillations whose frequency is 5 Hz or below. Accordingly, sinusoidal oscillations are employed as an alternative characteristic for the earthquake for inspection of a seismosensitive device comprising the above-described seismosensitive element. For example, in the above-described acceleration responsive device of the first through eleventh embodiments having contacts closed and opened by the rolling of inertia ball, each of "on" and "off" periods of a signal is set at 40 milliseconds or above. In this case, when such a signal as described above is generated three times or more within a predetermined period such as three seconds, the microcomputer is arranged to determine the occurrence of an earthquake, thereby delivering a detection signal. The quake of the earthquake is thus distinguished from the disturbing oscillations.

For the purpose of distinguishing the earthquake from the other disturbing oscillations, the seismosensitive element is required to have different response characteristics between a frequency band of the earthquake oscillation and the other frequency band. For example, an oscillational acceleration reaches 120 gal when the sinusoidal waves whose frequencies are 5 Hz or below are applied to the seismosensitive element. The acceleration of 120 gal corresponds to the Seismic intensity 5. When such sinusoidal waves corresponding to the acceleration of 120 gal are applied to the seismosensitive element, the microcomputer is desirable to deliver the detection signal indicative of occurrence of earthquake to thereby operate a safety device such as the gas shutoff valve. Furthermore, the microcomputer is desirable not to make an erroneous response when the acceleration responsive device is subjected even to the acceleration of 300 gal at the frequency of 6 Hz or above.

Control devices such as the gas flowmeter are usually equipped outdoors for the purpose of inspection thereof. For example, the control device is mounted on an outer wall of a building with piping. Accordingly, the control device faces a passage or a playing yard for children. The body of a passenger, his or her luggage, a bicycle or a ball with which children is playing catch sometimes collides against the control device. In such a case, an impulse wave whose acceleration ranges between from 1,000 to 3,000 gal is produced although the acceleration takes different values to some extent depending upon a space between support positions of a metal fixture for the gas piping. Subsequently to the above-described production of the impulse wave, the acceleration starts to be damped from about 1,000 gal. The damped oscillations contain waves which are approximate to sinusoidal waves and whose frequencies are about 10 Hz. The experiments carried out by the inventors show that such oscillations acceleration as described above are applied to the gas flowmeter.

The signal delivered from the seismosensitive element theoretically has a period in accordance with a period of oscillation applied to the element. Accordingly, when the oscillation frequencies are about 10 Hz as in the above-described case, the period of either "on" or "off" signal does not reach 40 milliseconds, so that the microcomputer does not take the oscillations for an earthquake.

However, the inertia ball is enclosed in a circular cylindrical or hemispheric housing as in the above-described seismosensitive element. The inertia ball sometimes rotates along the inner wall of the housing or the electrode when the impulse applied to the element is large. In this case, because of the difference between the frequency of the applied oscillation and a resonance frequency depending upon the elasticity of the electrode, the configuration of the housing bottom and the mass of the inertia ball, the motion of the inertia ball is shifted to an incomplete circular motion resulting in an elliptic or polygonal trajectory in a stage that the oscillation damps. Consequently, the period of the output signal of the seismosensitive element does not always depend upon the frequency of the applied oscillation, or rather, the time length of the "on" or "off" signal corresponds to the condition for determination of an earthquake in the stage that the oscillation damps, which makes it difficult to distinguish the earthquake from the disturbing oscillation. Accordingly, additional embodiments of the invention described herein below solve this problem.

A twelfth embodiment of the present invention will now be described with reference to FIGS. 28 and 29. An acceleration responsive switch 201 comprises a circular metal header 202 having a through-aperture 202A formed in the center thereof. An electrically conductive lead terminal 203 is hermetically secured in the through-aperture 202A by an electrically insulative filler 204 such as glass so as to extend therethrough. The header 202 has a peripheral flange 202B to which an open end of a bottomed cylindrical metal housing 205 is hermetically secured by way of ring projection welding, so that the header 202 and the housing 205 constitute a hermetic receptacle in which gases and moisture are prevented from penetrating into and leaking out of it. An inner bottom face 205A of the housing 205 includes an inclined or conical face 205D gently rising concentrically outwardly substantially from the center of the bottom.

An electrically conductive contact member 206 is conductively secured to the distal end of the lead terminal 203 located in the housing 205. The contact member 206 has a plurality of contact portions or feather portions 206A each having sufficient elasticity. The feather portions 206A are arranged radially to be approximately concentric with the housing 205. Each feather portion 206A is formed of a phosphor bronze sheet having a thickness of 0.01 to 0.03 millimeters when an inertia ball 207 which will be described later has the mass of 0.7 gram, for example.

The electrically conductive inertia ball 207 is enclosed in the housing 205. In a normal attitude in a stationary state, the inertia ball 207 is located on a rest portion 205B which is near the center of the conical face 205D of the housing bottom. The inertia ball 207 may be an electrically conductive solid ball formed of iron, copper or alloy of them. When subjected to an oscillation with a predetermined acceleration or above due to an earthquake or the like, the inertia ball 207 is capable of rolling on the conical or inclined face 205D of the housing bottom face until it comes into contact with an inner side wall 205E or a protrusion 205C which will be described later, as shown by dotted line in FIG. 28. The inertia ball 207 is further capable of coming into contact with and departing from one or more of the feather portions 206A of the contact member 206 in the course of its rolling motion. Consequently, the inertia ball 207 provides for an electrical on-off action. A protector 208 is secured to the underside of the portion of the contact member 206 at which portion it is secured to the lead terminal 203. The protector 208 prevents deformation of the contact member 206 due to the collision of the inertia ball 207 against it.

Figure 29:
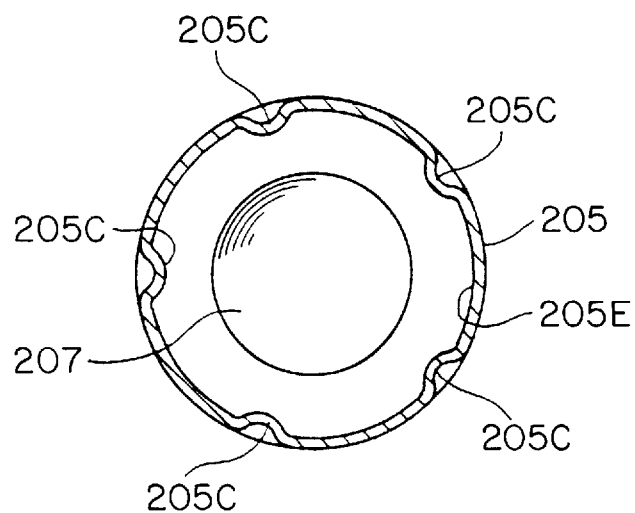
FIG. 29 is a sectional view of the acceleration responsive switch taken along line 29—29 in FIG. 28.
Figure 30:
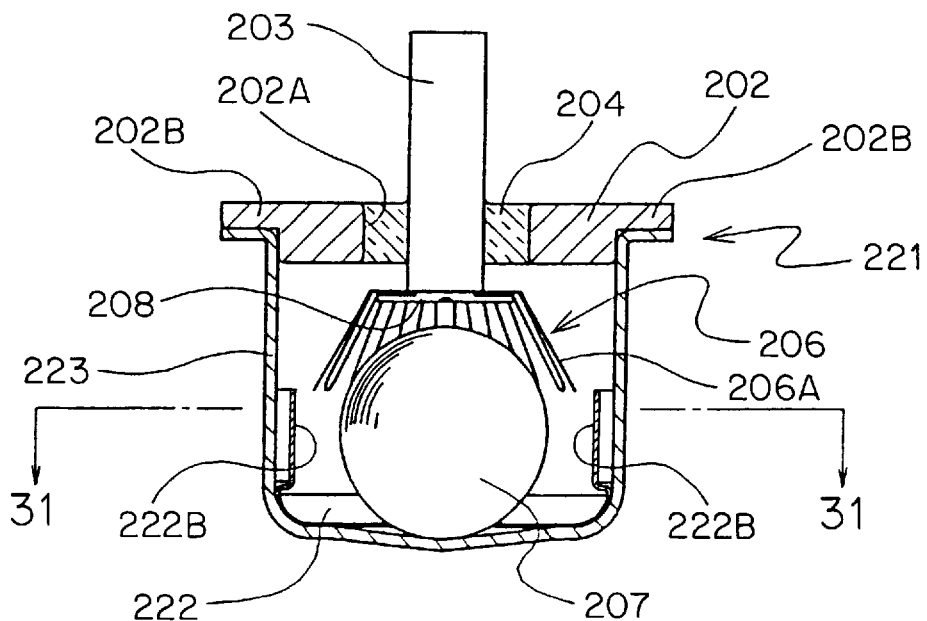
FIG. 30 is a longitudinal sectional view of a thirteenth embodiment of an acceleration responsive switch in accordance with the present invention.
Figure 31:
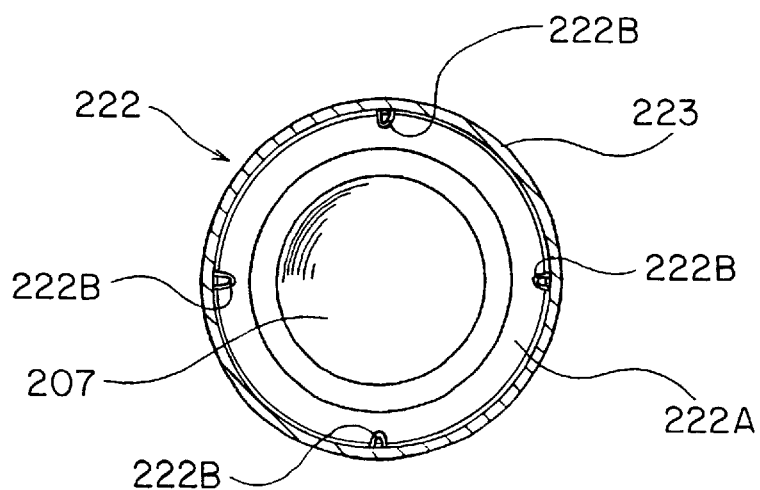
FIG. 31 is a sectional view of the acceleration responsive switch taken along line 31—31 in FIG. 30.

Five protrusions 205C each serving as a collision portion are formed circumferentially at regular intervals on the inner side wall 205E of the housing 205, as shown in FIG. 29. The protrusions 205C are formed by way of pressing, for example. The number of the protrusions 205C depends upon a resonance frequency of the inertia ball 207 which further depends upon the size of the housing 205 or the inertia ball 207, the material of the inertia ball 207 and the like. The protrusions 205C are formed at the regular intervals on the circumferential face of the inner side of the housing 205 along which face the inertia ball 207 rolls sliding on the feather portions 206A of the contact member 206. The number of the protrusions 205C may be two, three, four or more than five. Furthermore, the collision portion such as the protrusion 205C may take the form of a column extending upwardly from the outer portion of the bottom of the housing 205 if the configuration of a rolling section 205D1 corresponding to a range in which the inertia ball 207 actually moves until colliding against the inner side wall of the housing 205 is not influenced by the pressing or the like. Furthermore, an amount of protrusion of each protrusion 205C toward the interior of the housing 205 is selected so that the contact of the inertia ball 207 with the contact member 206 is not disturbed even if the inertia ball 207 is located at a position where it is capable of coming into contact with the protrusion 205C and so that the direction of the inertia ball 207 in the circular motion can be reliably changed without direct contact of the contact member 206 with the protrusion 205C. Additionally, the circumferential width of the protrusion 205C is desirable to be as small as possible, so that the moving distance of the inertia ball 207 can be prevented from being reduced by the head-on collision of the inertia ball 207 against the protrusion 205C during its reciprocal oscillation or that is, the time length of the signal generated by the acceleration responsive switch can be prevented from being reduced. Moreover, the inertia ball 207 is repelled back to the side wall 205E of the housing 205 when colliding against the protrusion 205C obliquely but not frontally. Accordingly, since the reduction in the moving distance of the inertia ball 207 can be prevented, the time period of contact of the inertia ball 207 with the contact member 206 is not almost influenced.

The operation of the acceleration responsive switch according to the twelfth embodiment will be described. As described above, the inertia ball 207 is located on the rest portion 205B in its normal attitude in the stationary state. Since the inertia ball 207 is not in contact with the contact member 206 in this state, electricity is not conducted between the lead terminal and the housing 205 or the header 202. Consequently, no signal is delivered.

When the acceleration responsive switch 201 is subjected to a transverse acceleration of a predetermined value or above, the inertia ball 207 rolls on the inclined face 205D of the housing bottom face 205A, coming into contact with one or more of the feather portions 206A of the contact member 206. Consequently, since electricity is conducted between the contact member 206 and the housing 205, an electric path is formed by the lead terminal 203, the contact member 206, the inertia ball 207, the housing 205 and the header 202 sequentially so that a signal is delivered.

The motion of the inertia ball 207 is theoretically a reciprocating motion along the center line of the housing 205 depending upon the direction of the oscillation applied to the inertia ball 207 when an oscillation mode is a reciprocating motion in a fixed direction during the rolling of the inertia ball 207. Actually, however, a slight acceleration component having the direction intersecting that of the applied oscillation sometimes acts on the inertia ball 207 because of inclination in the contact of the inertia ball 207 with the feather portions 206A or unbalance of slightly concave and convex portions on the inclined face 205D. Such a transverse component force of the acceleration causes the inertia ball 207 to deviate from the center of the housing 205, whereupon the motion of the inertia ball 207 sometimes develops to a rotational motion with circular, elliptic or 8-shaped loci. Upon occurrence of such a rotation motion, the inertia ball 207 continuously comes into contact with the feather portions 206A and accordingly, an output signal form the lead terminal 203 becomes a continuous signal having the time length of one second or above, on which continuous signal occurrence of an abnormal condition is determined. Furthermore, the contact of the inertia ball 207 with the feather portions 206A becomes intermittent in the stage that such a rotational motion of the inertia ball 207 dampens. Consequently, a detection signal with a time length and such generation intervals similar to those of an earthquake is accidentally determined erroneously to be indicative of occurrence of an earthquake. A microcomputer erroneously determines occurrence of an earthquake in the case where the above-described abnormal condition occurs when the frequency of the oscillation applied to the acceleration responsive switch 201 is in the range between 7 and 10 Hz.

In the above-described acceleration responsive switch, however, the protrusions 205C each serving as the collision portion are formed on the side wall 205E of the housing 205. The inertia ball 207 collides against the protrusion 205C when initiating the rotational motion, so that the direction of its motion is suddenly turned. As a result, the contact of the inertia ball 207 with the contact member 206 is temporarily interrupted so that the continuous generation of the "on" signal is avoided. At the same time, the collision of the inertia ball 207 against the protrusion 205C rapidly reduces the kinetic energy of the inertia ball 207 so that the rotational motion of the inertia ball 207 is terminated in a short period of time, whereby its normal reciprocating motion approximate to the linear motion can be recovered. Thus, the time length and the number of times of generation of the "on" or "off" signal can be prevented from satisfying the condition of determination of an earthquake by the termination of the rotational motion of the inertia ball 207 in such a short period of time.

Experiments carried out by the inventors show that it takes 15 seconds or less to terminate the rotational motion of the inertia ball 207 in the acceleration responsive switch having the protrusions 205C on the housing 205 while it takes 20 to 30 seconds in the case where the housing is not provided with such protrusions 205C. The "on" signal with a period of 40 milliseconds may be generated during termination of the rotational motion of the inertia ball 207 in the system wherein the microcomputer determines occurrence of an earthquake with the "on" and "off" signals each having the period of 40 milliseconds or above are generated. However, the rotational motion of the inertia ball 207 is reduced to a slight oscillation without contact with the contact member 206 before the signals are generated three times.

Figure 28:
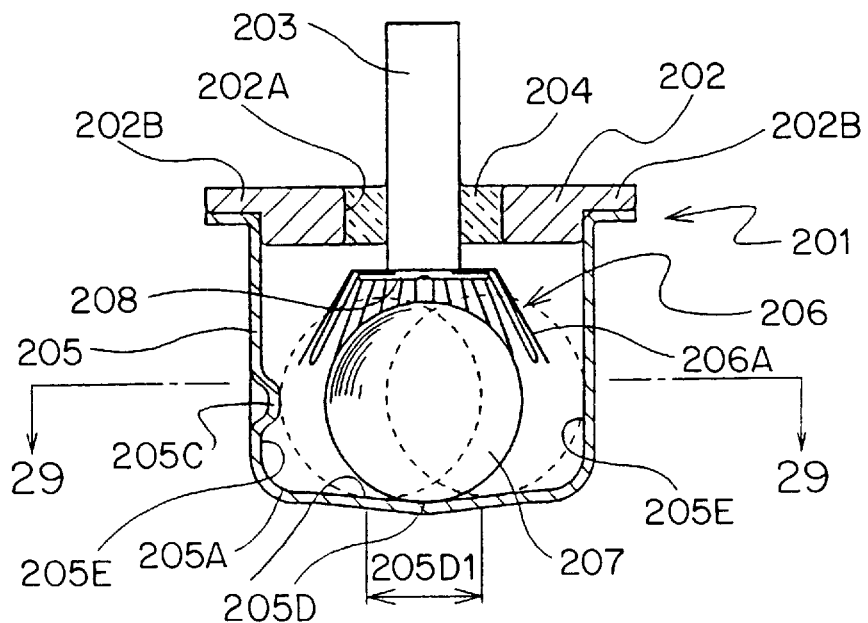
FIG. 28 is a longitudinal sectional view of a twelfth embodiment of an acceleration responsive switch in accordance with the present invention.
Figure 32:
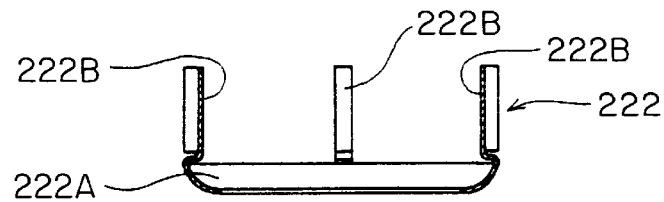
FIG. 32 is a longitudinal sectional view of a collision member employed in the acceleration responsive switch of the thirteenth embodiment.
Figure 33:
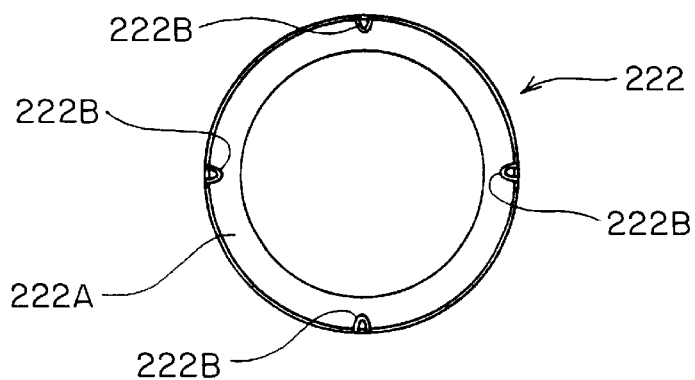
FIG. 33 is a plan view of the collision member employed in the acceleration responsive switch of the thirteenth embodiment.

The collision portion should not be limited to the protrusion 205C as shown in FIG. 28. FIGS. 30 to 33 illustrate a modified form of the collision portion of the acceleration responsive switch 221 as a thirteenth embodiment of the invention. As in the foregoing embodiment, the collision member 222 in the thirteenth embodiment suddenly changes the direction of motion of the inertia ball 207 when its motion is turned to the rotational motion and reduces the kinetic energy of the inertia ball 207. The same reference numerals are employed for the similar parts in the thirteenth embodiment as in the twelfth embodiment. The collision member 222 is formed of iron, its alloy or plastics. The collision member 222 comprises a ring-shaped base 222A and collision portions 222B formed circumferentially at regular intervals on the base 222A, as shown in FIGS. 32 and 33. The collision member 222 is inserted into the housing 205 to be secured in position so that the collision portions 222B are located at predetermined positions. Since the rolling section 205D1 (see FIG. 28) for the inertia ball 207 is located inside the ring-shaped base 222A, the collision member 222 does not influence the basic rolling characteristic of the inertia ball 207.

Each collision portion 222B of the collision member 222 has the same effect as that of each protrusion 205C in the foregoing embodiment. In particular, since the collision member 222 is a part separate from the housing 223, the collision member 222 can be formed of a material thinner or elastically more deformable that of the housing 223 so that more kinetic energy of the inertia ball 207 is absorbed by each collision portion 222B than by each protrusion 205C which is nearly a rigid body. Consequently, the rotational motion of the inertia ball 207 can be terminated more quickly than in the twelfth embodiment.

Figure 34:
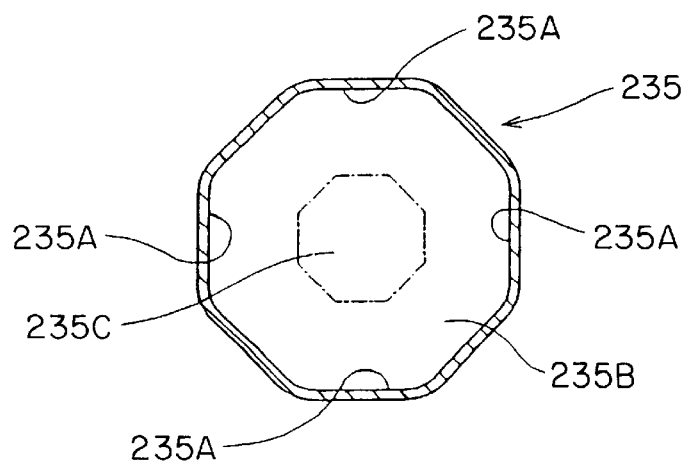
FIG. 34 is a sectional view similar to FIG. 29, showing a fourteenth embodiment of an acceleration responsive switch in accordance with the present invention.

FIG. 34 illustrates a fourteenth embodiment of the invention. In the fourteenth embodiment, the side wall 235A of the housing 235 is polygonal or its curvature is varied so that the housing 235 has a non-circular section, whereby the side wall 235A substantially serves as the collision portion.

Consequently, the rotational motion of the inertia ball 207 along the inner circumferential face of the housing 235 becomes unstable, thereby being terminated. In this construction, too, the housing bottom face 235B includes the rolling section or inclined face 235C as shown by chain line in FIG. 34. Furthermore, the distance of the rolling motion of the inertia ball 207 differs depending upon the direction of its motion. However, the detection of an earthquake can be performed substantially without hindrance when the diameter of the inertia ball 207 and the maximum and minimum diameters of the inner circumferential face of the housing 235 relative to each other are determined so that the difference of the time length of the "on" signal is minimized.

Figure 35:
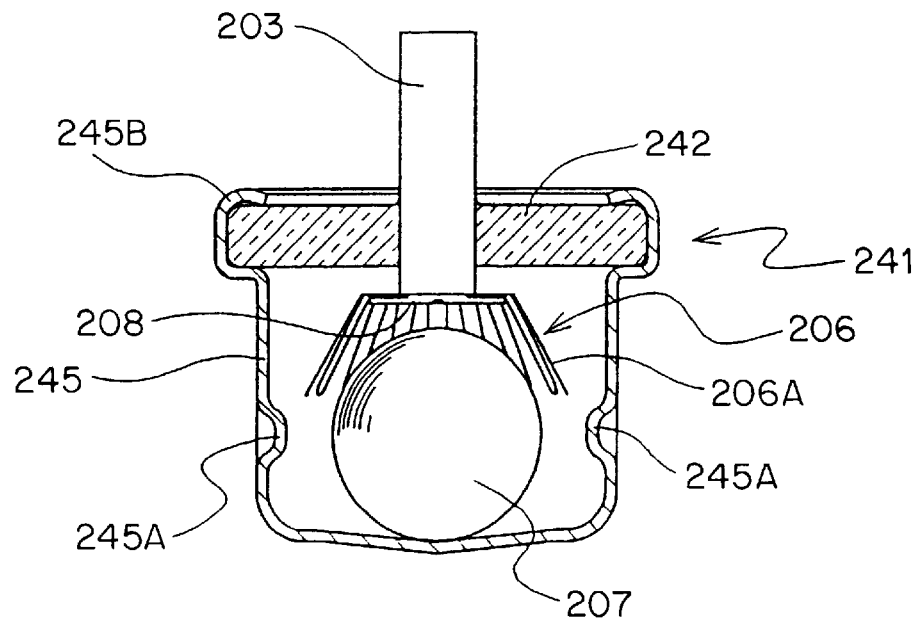
FIG. 35 is a longitudinal sectional view of a fifteenth embodiment of an acceleration responsive switch in accordance with the present invention.

FIG. 35 illustrates a fifteenth embodiment of the invention. The acceleration responsive switch 241 comprises a header 242 formed of an electrically insulating material such as plastics or ceramic. The header 242 has a generally central through-aperture in which the lead terminal 203 is secured. The configuration of the bottom of the housing 245 and the protrusions 245A are the same as those shown in FIG. 28. The housing 245 has a flange or securing portion 245B formed on its open end. The header 242 is secured to the open end of the housing 245 by way of crimping. Accordingly, since the welding work is not necessitated, the assembly of the acceleration responsive switch can be rendered easier.

The receptacle comprising the housing 245 and the header 242 is not hermetically closed in the fifteenth embodiment. There is no inconvenience when the acceleration responsive switch 241 is disposed in a vacuum or in an inert atmosphere. Furthermore, the acceleration responsive switch 241 can be disposed in an atmospheric air when the surfaces of the inertia ball 207, the portion of the inner face of the housing 245 brought into contact with the inertia ball 207 and the contact member 206 are treated or when these parts are formed from material not corroding in the atmosphere. Additionally, the acceleration responsive switch 241 can be used as a seismosensitive device when the header 242 is secured to the securing portion 245B with an adhesive so that the receptacle is sealed, as will be described later.

Figure 36:
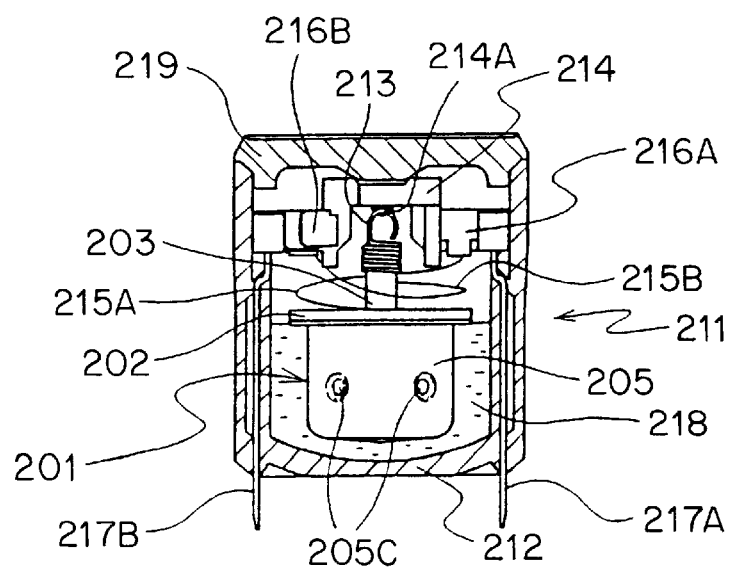
FIG. 36 is a longitudinal sectional view of a seismosensitive element employing the acceleration responsive switch in accordance with the present invention.

FIG. 36 shows a case where the acceleration responsive switch serving as a seismosensitive element is mounted on a gas flowmeter having an integrated microcomputer. The seismosensitive device 211 comprises an outer case 212 enclosing therein the acceleration responsive switch 201. A hook 213 provided on the lead terminal 203 is hung on a hanger 214A of a support 214 mounted in the outer case 212 so that the acceleration responsive switch 201 is rockably suspended and so that the gravity causes the acceleration responsive switch 201 to assume its normal attitude. One ends of sufficiently flexible leads 215A and 215B are connected to the header 202 and the lead terminal 203, respectively. The other ends of the leads 215A, 215B are connected through connecting terminals 216A and 216B to conductive terminals 217A and 217B provided in the outer casing 212 by way of insert molding, respectively. The outer case 212 is filled with a predetermined amount of a viscous fluid 218. An outer lid 219 is secured to an open end of the outer case 212 with such a level of tightness that the viscous fluid 218 is prevented from leaking out of the outer case 212.

The seismosensitive device 211 is directly mounted on a printed circuit board of a control device (neither shown) and connected by the conductive terminals 217A, 217B to the wiring on the circuit board. The attitude of the acceleration responsive switch 201 mounted on the circuit board has a great influence on its operating characteristics. For example, the responsive acceleration varies by about 20 gal when the acceleration responsive switch 201 is inclined by one degree relative to its normal attitude. Thus, since a high level of accuracy is required in mounting the acceleration responsive switch 201 on the circuit board, it is difficult to directly mount it on the circuit board. However, the acceleration responsive switch 201 is suspended in the outer case 212 in the above-described seismosensitive device 211. Accordingly, the self-weight causes the acceleration responsive switch 201 to assume its normal attitude when the attitude of the seismosensitive device mounted on the circuit board is within an allowable range of inclination. Thus, since the degree of accuracy in the mounting of the seismosensitive device is reduced, the mounting work can be performed more easily.

Furthermore, the outer case 212 is filled with the viscous fluid 218 having the preselected viscosity, such as the silicon oil together with the acceleration responsive switch 201. Consequently, the acceleration responsive switch 201 delivers an operation signal in response to overturn or sudden inclination of the equipment on which the seismosensitive device is mounted or the oscillation due to an earthquake. Additionally, the viscosity of the viscous fluid 218 is selected so that the acceleration responsive switch returns back to the normal attitude in 30 seconds, for example, when the inclination of the seismosensitive device 211 changes.

Figure 37:
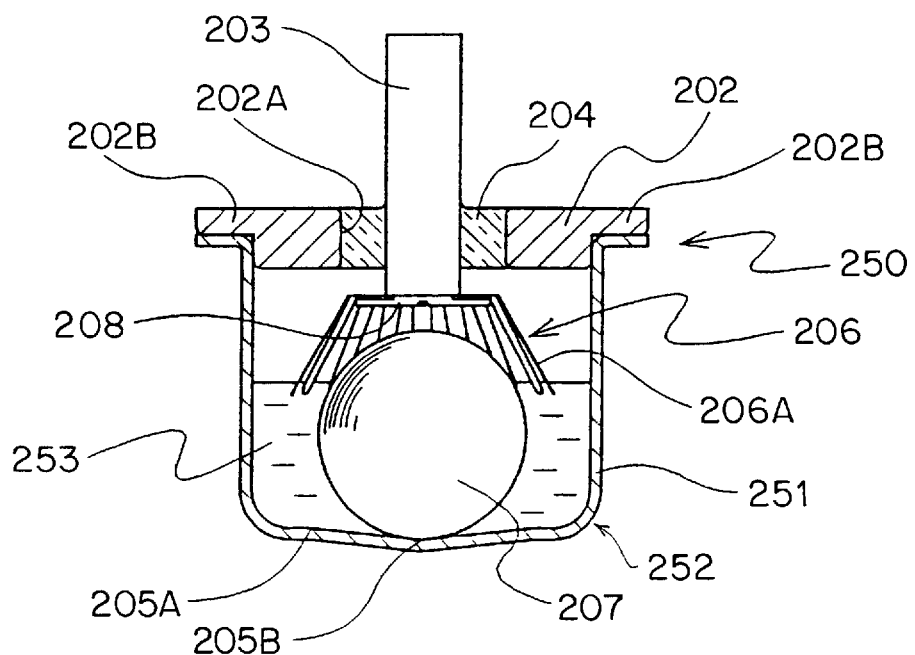
FIG. 37 is a longitudinal sectional view of a sixteenth embodiment of an acceleration responsive switch in accordance with the present invention.

FIG. 37 illustrates a sixteenth embodiment of the invention. The acceleration responsive switch 250 comprises a housing 251 which is substantially the same as shown in FIG. 28 with the protrusions 205C eliminated, and a header 202. The housing 251 and the header 202 constitute an hermetic receptacle 252 accommodating the oscillation damping liquid 253 and the inertia ball 207.

The oscillation damping liquid 253 is an inert liquid and desirably one having a relatively low viscosity and small surface tension, for example, a fluorine inert liquid such as type FC-75 sold under the trademark of FLUORINERT by 3M, U.S.A. The oscillation damping liquid 253 accommodated in the receptacle 252 preferably ranges between an amount in which one fourth of the diameter of the inertial ball 207 is immersed in the liquid and an amount in which the whole inertia ball 207 is immersed. A gas is enclosed over the free surface of the oscillation damping liquid 253 in the receptacle 252 so that the receptacle 252 can be prevented from being deformed by the expansion and contraction of the liquid 253 due to temperature changes.

The acceleration responsive switch 250 normally operates in the same manner as shown in FIG. 28. Particularly, even when a component force intersecting the direction of an external oscillation is applied to the inertia ball 207, the development of the motion of the inertia ball 207 in the direction of the component force can be restrained by the viscosity of the oscillation damping liquid 253. Consequently, when the inertia ball 207 is rotated in the hermetic receptacle 252 in response to the oscillation whose frequency ranges 7 to 10 Hz, the acceleration responsive switch 250 can be prevented from delivering the signal on which the microcomputer erroneously determines occurrence of an earthquake or overturn of the equipment.

In one experiment, 0.2 to 0.3 gram of oscillation damping liquid whose dynamic viscosity ranges 3 to 0.4 centistoke at the temperature of −30° to 60° C. is used. The inertia ball 207 starts to roll when the sinusoidal oscillations applied to the acceleration responsive switch 250 in which the oscillation damping liquid is not used reaches the acceleration of 110 gal. On the other hand, the inertia ball 207 starts to roll at the acceleration of 120 gal when the oscillation damping liquid 253 is accommodated in the receptacle 252. This acceleration is in the range of 80 to 250 gal, which range corresponds to the Seismic intensity 5. Thus, the acceleration responsive switch 250 poses no problem with respect to its acceleration responsiveness.

In another experiment, the frequency of the applied oscillation ranges 7 to 8 Hz and its acceleration is increased to 300 to 500 gal. When the oscillation damping liquid 253 is not used, the inertia ball 207 is subjected to a slight acceleration component induced in the direction of a component force intersecting the direction of the applied oscillation and its motion is developed in the direction of the component force. On the other hand, such undesirable motion of the inertia ball 207 as mentioned above is not almost produced and the inertia ball 207 moves substantially only in the direction of the applied oscillation when the oscillation damping liquid 253 is accommodated in the receptacle 252. A threshold value of the acceleration causing the inertia ball 207 to start its motion can be adjusted by changing the configuration of the bottom of the housing 205 and the like.

Since the oscillation damping liquid 253 is accommodated in the receptacle 252, the rotational motion of the inertia ball 207 can be terminated in a short period of time even if the inertia ball 207 should cause the rotational motion.

Experiments carried out by the inventors show that it takes 10 seconds or less to terminate the rotational motion of the inertia ball 207 in the acceleration responsive switch having the oscillation damping liquid 253 accommodated in the receptacle 252 while it takes 20 to 30 in the case where such oscillation damping liquid is not accommodated in the receptacle. The "on" and "off" signals each having the period of 40 milliseconds or above are not generated three times for three seconds during such a short period of time as described above. Consequently, the microcomputer can be prevented from erroneously determining occurrence of an earthquake.

Furthermore, the inert oscillation damping liquid 253 accommodated in the hermetic receptacle 252 prevents soil from cohering onto the surfaces of the contact member 206 and the inertia ball 207. Furthermore, the inertia ball 207 agitates the oscillation damping liquid 253 during the oscillation, thereby causing it to flow in the receptacle 252. Consequently, since the soil can be removed easily, the amplitude of the signal is rendered stable and the initial responsiveness of the acceleration responsive switch can be maintained for a long period of time.

A first method of making the acceleration responsive switch 250 will be described. Since the working voltage applied to the acceleration responsive switch of the above-described type is usually low and the current is feeble, the contact resistance changes to a large extent when an oxide film is produced on the surfaces of the contact member or the inertia ball or the inner surface of the receptacle. For the purpose of preventing formation of the oxide film, the receptacle 252 is hermetically closed, and a pollution preventing gas preventing oxidation or the like, for example, an inert gas such as helium or argon, nitrogen or hydrogen is enclosed in the receptacle 252 by replacement of the atmosphere in the receptacle 252. Airtightness is preferably inspected with a helium detector when the helium is particularly enclosed in the receptacle 252.

In replacement of the atmosphere in the receptacle with the pollution preventing gas, the pressure in the interior of the receptacle is reduced to 0.05 torr or below, that is, about one fifteen thousandth atmospheric pressure when the header is welded to the housing in the conventional acceleration responsive switch wherein the oscillation damping liquid is not employed. The interior of the receptacle is thus exhausted and thereafter, the receptacle is filled with the pollution preventing gas. The receptacle is then hermetically closed by way of welding. In the assembly of the acceleration responsive switch in accordance with the present invention, the oscillation damping liquid such as a fluorine inert liquid having low viscosity and high vapor pressure is poured into the receptacle in the atmosphere. In this case, there is a problem that the pressure in the receptacle is reduced far below the vapor pressure of the fluorine inert liquid such that the inert liquid evaporates in a moment when the exhausting operation is performed under a high vacuum as in the conventional manner so that the gaseous atmosphere in the receptacle is replaced by the pollution preventing gas at the conventional rate of replacement. To overcome the problem, the degree of vacuum in filling the receptacle with the pollution preventing gas needs to be rendered higher than the vapor pressure of the inert liquid or the temperature of the inert liquid in enclosing the pollution preventing gas in the receptacle needs to be decreased so that the vapor pressure of the inert liquid is reduced. However, the atmosphere in the receptacle cannot be replaced with the value obtained by the prior art or above when the degree of vacuum is restrained. Furthermore, the whole gas exchanger needs to be maintained at a low temperature in order that the temperature of the inert liquid is decreased, which results in a complicated and large-scaled gas exchanger.

Figure 38:
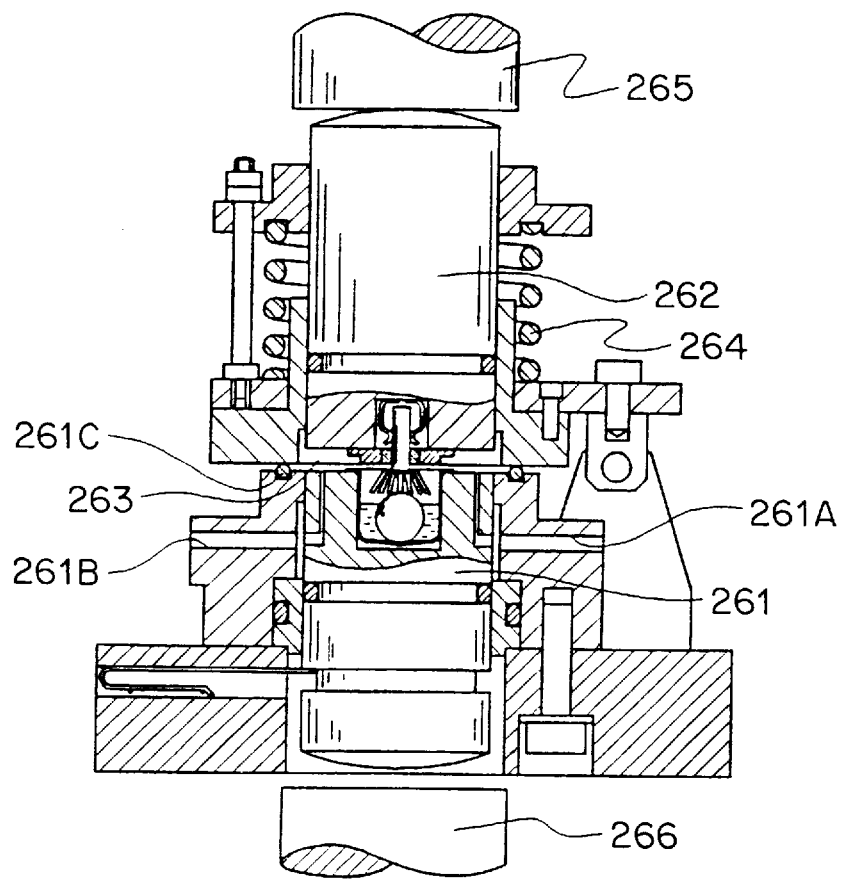
FIG. 38 is a longitudinal sectional view of a welder used in assembly of the acceleration responsive switch in accordance with the present invention.

In view of the foregoing, the exhaust and the gas filling are alternately performed repeatedly in the first method in accordance with the present invention so that the replacement rate of the gas in the receptacle can be increased to substantially the same value as in the case where the exhaust is performed in a high vacuum. One embodiment of the first method will be described with reference to FIGS. 37 and 38. FIG. 38 shows an example of a gas changer used in assembly of the acceleration responsive switch in accordance with the present invention. Although a welder is eliminated in FIG. 38, welding electrodes and their peripheral parts are shown.

A welder used with the gas exchanger is preferably supplied with a secondary side current of a transformer having a primary coil to which electric charge in a capacitor is discharged. Furthermore, the welder includes an upper electrode 265 and a lower electrode 266. A large current is caused to flow through the electrodes when pressure is applied vertically to them. A chamber 263 is defined by lower and upper supports 261 and 262 between the electrodes 266 and 265. Open ends of the lower and upper supports 261 and 262 are hermetically adjacent to each other with an O-ring packing 261C therebetween. An assembly of the contact member 206, the lead terminal 203 and the header 202 and the housing 251 accommodating the inertia ball and the inert liquid are held in the chamber 263. Each of the upper and lower supports 262 and 261 is an electrode capable of conducting a large current therethrough and is formed from a material such as chromium copper, for example.

A path 261A communicating with the chamber 263 is connected via an exhausting electromagnetic valve (not shown) to a vacuum pump, so that air in the chamber 263 is exhausted via the path 261A. A path 261B also communicating with the chamber 263 is connected via a gas filling electromagnetic valve (not shown) to a gas supply source so that the pollution preventing inert gas is supplied via the path 261B into the acceleration responsive switch housing 251 in the chamber 263.

After header side parts and housing side parts have been held in the chamber 263, the exhausting electromagnetic valve at the side of the path 261A is opened so that air in the chamber 263 is exhausted through the path 261A. The exhausting electromagnetic valve is closed when a predetermined pressure higher than the vapor pressure of the inert liquid is reached in the chamber 263. The gas filling electromagnetic valve at the side of the path 261B is then opened so that the interior of the acceleration responsive switch housing 251 is filled with the pollution preventing inert gas supplied from the supply source such as a gas cylinder via the path 261B and the chamber 263. The gas filling electromagnetic valve is closed when a predetermined amount of the inert gas is reached in the acceleration responsive switch housing 251. A small gap is maintained between the open end of the acceleration responsive switch housing 251 and the peripheral edge of the header 202 until the above-described step is completed.

For example, when the vapor pressure of the inert liquid at the room temperature is 20 torr, the pressure in the housing under the pressure reduced condition needs to be restricted to about 30 torr, that is, about $\frac{1}{25}$ atmospheric pressure. Even when the inert gas is supplied into the housing after the pressure therein is reduced to 30 torr, a gas existing before the exhausting operation or usually, air amounting to $\frac{1}{25}$ is remaining in the housing.

In the present invention, however, the exhausting operation and the gas filling operation are alternately performed repeatedly at predetermined number of times so that the replacement rate of the gas in the housing is decreased. For example, when the exhausting operation and the gas filling operation are alternately performed repeatedly three times, the amount of remaining air is reduced to the cube of $\frac{1}{25}$, that is, about 1/15,625, which value is the same as that obtained when the inert gas is supplied into the housing after the pressure has been reduced to 0.05 torr.

The upper support 262 of the chamber 263 has a double action structure, that is, the upper support 262 keeps the airtightness and is vertically movable. The portion of the upper support member 262 holding the header 202 is held at a predetermined position by a coil spring 264 which has a repulsion against the atmospheric pressure applied thereto. When more force is applied to the portion, the peripheral edge of the header 202 is brought into contact with the open end of the acceleration responsive switch housing 251 with a predetermined contact pressure therebetween. Thereafter, the upper and lower supports 262 and 261 are held between the upper and lower electrodes 265 and 266 of the welder of the condenser discharge type so that a large current is momentarily caused to flow through the electrodes, whereby a hermetic welding called "ring projection welding" is completed. Helium is usually mixed with the inert gas for the leak test. Airtightness is confirmed with a helium detector after the hermetic welding and a confirmed amount of leakage is usually $10^{-9}$ atm·CC/sec or below.

According to the above-described method, even when the pressure in the chamber 263 is higher than the vapor pressure of the inert gas during the exhausting operation, the replacement rate of the gas in the housing can be increased to substantially the same value as in the case where the exhaust is conventionally performed in a high vacuum. Furthermore, since the high vacuum is not necessary in the exhausting operation, the exhaust pump with the lower performance than the conventionally used pump can be used. Thus, an expensive pump is not necessitated.

The pressure for the exhausting operation needs to be lowered as the vapor pressure of the inert gas becomes lower in the above-described first method. Consequently, since the number of times of repeat of the exhausting and gas filling operations is increased, the number of working steps is increased. Accordingly, the number of the chambers 263 needs to be increased for the improvement of the production capacity, which renders the gas exchanger incorporation the welder large-scaled.

To overcome the above-described drawback, the present invention provides a second method of making the acceleration responsive switch. One embodiment of the second method will be described with reference to FIG. 38. In the second method, the gas filling electromagnetic valve and the exhausting electromagnetic valve are simultaneously opened after the header 202 and the acceleration responsive switch housing 251 have been held in the chamber 263, so that the gas supply via the path 261B and the exhaust via the path 261A are simultaneously performed. Consequently, a predetermined gas such as the inert gas is caused to sufficiently flow through the interior of the acceleration responsive switch housing 251, whereby the air in the housing is replaced by the inert gas. Both valves are closed when a predetermined period of time for achievement of a predetermined replacement rate has elapsed or when a predetermined amount of inert gas has been caused to flow through the chamber. Subsequently, the header is hermetically sealed to the housing by the ring projection welding.

According to the second method, the pollution preventing gas such as the inert gas is caused to flow through the housing so that a sufficient replacement occurs, and thereafter, the housing is sealed. Accordingly, the gas replacing work can be performed in a short period of time even though the liquid accommodated in the housing has a high vapor pressure. Consequently, the gas exchanger can be prevented from being large-scaled and the efficiency of the gas filling work can be prevented from being lowered.

A third method of making the acceleration responsive switch in accordance with the present invention will be described. In the third method, when the gas exchanger as shown in FIG. 38 is used, for example, the inertia ball has been enclosed in the housing 251 but the inert liquid 253 has not been accommodated in it when the housing 251 and the header 202 are held in the chamber 263. In this state, the pressure in the chamber 263 is reduced to a high vacuum, for example, 0.05 torr or below, by the exhausting means in the same manner as in the conventional gas replacing work. Thereafter, the pollution preventing gas is supplied into the housing and thereafter, a predetermined amount of the inert liquid 253 is poured into the housing. The housing is then sealed.

According to the third method, the oscillation damping liquid has not been accommodated in the housing when the pressure in it is reduced. Accordingly, since the interior of the housing can be reduced to a sufficiently low pressure, each of the exhausting operation and the gas filling operation can be completed only once, which improves the working efficiency.

Various gases and usually air are dissolved in the inert liquid before it is poured into the receptacle. Even when the gas in the receptacle is replaced by the inert gas and then the receptacle is sealed, there is a possibility that a part of the gas dissolved in the inert liquid, for example, oxygen of the air may form a film on the surfaces of the parts. To prevent this, the third method preferably includes a step of previously removing the dissolved gases from the inert liquid.

To achieve the same effect, the foregoing first method may include a step of maintaining the housing in a pressure reduced state for a predetermined period of time and removing the gases dissolved in the inert liquid 253. In this case, the inert gas may also evaporate. However, a predetermined amount of the inert liquid can reliably be poured into the housing when the amount of the inert liquid is determined in view of its amount evaporated in due consideration of the ambient temperature and the like.

A fourth method of making the acceleration responsive switch will now be described. In the foregoing methods, the gas in the receptacle 252 is replaced by the pollution preventing gas. In the fourth method, however, the gas in the housing is exhausted so that the pressure in it is reduced. Thereafter, the housing is sealed. Consequently, since the space in the receptacle 252 is filled with vapor of the inert liquid 253, the pollution preventing inert gas need not be supplied into the receptacle. Thus, the working efficiency can be improved.

The oscillation damping liquid used in the acceleration responsive switch in accordance with the present invention will now be described. The fluorine inert liquid is employed as the oscillation damping liquid in the foregoing embodiments. Since the fluorine inert liquid has relatively high specific gravity, there is a possibility that the contact pressure between the inertia ball and the housing may be lowered by buoyancy resulting from the liquid. Furthermore, the viscosity of the fluorine inert liquid varies to a large extent depending upon the temperature. When the viscosity of the oscillating damping liquid varies depending upon the temperature, the movability of the inertia ball also varies depending upon the temperature. Consequently, the time length of the signal generated by the acceleration responsive switch varies depending upon the temperature, which may result in erroneous determination of an earthquake. Furthermore, the experiment carried out by the inventors confirms that the "on" signal generated by the acceleration responsive switch takes a minute interrupted waveform when the ambient temperature is about 0° C. Such an interrupted waveform is seen when the chattering occurs between the contacts. The experiment also confirms that the reason for the occurrence of the interrupted waveform is that the water contained in the fluorine inert liquid as the oscillation damping liquid freezes and that resultant ice prevents electric conduction between the inertia ball and the contact member.

In view of the above-described problems, a desirable oscillation damping liquid includes alcohol, an alcohol added liquid, water-eliminated hydrocarbon. However, since the alcohol is electrically conductive, it brings about a leakage current. Accordingly, the alcohol is not preferable as the oscillation damping liquid. Furthermore, it is difficult to eliminate the water content from hydrocarbon. The water content cannot be completely eliminated from hydrocarbon.

The inventors provide, as a preferable oscillation damping liquid, a mixed liquid of hydrocarbon or silicon oil as a main liquid and a predetermined amount of a liquid added to the main liquid. The hydrocarbon is preferably pentane, hexane, heptane or toluene. The added liquid is preferably alcohol (methyl or ethyl alcohol) or a silane coupling agent reacting to the water content to thereby produce alcohol. The silane coupling agent is preferably methyltrimethoxysilane or vinyltrimethoxysilane.

In the embodiment, the oscillation damping liquid 253 consists of hexane and 3% of methylalcohol in the volume ratio. The amount of the oscillation damping liquid 253 is determined so that the distal end of each feather portion 206a of the contact member 206 is immersed in the oscillation damping liquid and so that a space in which gases exist is defined over the liquid surface for the purpose of preventing the hermetic receptacle being deformed by the expansion and contraction of the oscillation damping liquid due to temperature changes.

Since at least the distal end of each feather portion 206A of the contact member 206 is in contact with the oscillation damping liquid 253, the conductivity of the alcohol causes a slight current to flow when an amount of alcohol dissolved in the oscillation damping liquid 253. The amount of alcohol is determined so that the insulation resistance between the lead terminal and the housing takes predetermined value or above when the acceleration responsive switch is stationary. For example, 3% of alcohol in the volume ratio is dissolved in the oscillation damping liquid 253 in the embodiment, so that the above-mentioned slight current can be ignored.

The inventors carried out an experiment to confirm the insulation resistance between the lead terminal 203 and the housing 251 in the case where the methylalcohol is dissolved in hexane as the main liquid and the voltage applied to the acceleration responsive switch is 500 V. When the dissolved methylalcohol is up to 5% in the volume ratio, the insulation resistance takes the value of 100 MΩ or above. When the dissolved methylalcohol is 8%, the insulation resistance is 200 to 300 MΩ. When the dissolved methylalcohol is 10%, the insulation resistance is 40 to 60 MΩ. The conductivity is rapidly increased when the dissolved methylalcohol is 10% in the volume ratio. The insulation resistance of the acceleration responsive switch is set for 100 MΩ or above when the acceleration responsive switch in accordance with the present invention is incorporated in a gas flowmeter having an integrated microcomputer energized from a storage battery for a long period of time. Accordingly, when the oscillation damping liquid employed in the acceleration responsive switch required to be small in size consists of hexane as the main liquid and the methylalcohol dissolved in hexane, an amount of the methylalcohol dissolved in hexane is set for 8% or below in the volume ratio.

The inventors carried out another experiment in which the oscillation damping liquid consists of hexane and ethylalcohol dissolved in hexane. When an amount of the ethylalcohol is up to 8%, the insulation resistance is 100 MΩ or above. The insulation resistance is about 400 MΩ when the amount of the ethylalcohol is 10% and about 50 MΩ when the amount of the ethylalcohol is 15%. Accordingly, since an allowable range of amount of ethylalcohol dissolved in hexane is wider than in the methylalcohol, the control of the oscillation damping liquid can be rendered easier when the ethylalcohol is used as the added liquid. Furthermore, the methylalcohol is not soluble in hexane as compared with the ethylalcohol. Sufficient agitation is required when the methylalcohol is dissolved in hexane. Since the ethylalcohol is easily dissolved in hexane, such agitation is not necessary. Consequently, the oscillation damping liquid can be produced more easily when the ethylalcohol is used as the added liquid. The same effect of conductivity at low temperatures can be achieved when the amount of alcohol dissolved in the main liquid is 10% as when it is 8% or below, for example, 3%.

When alcohol is added to silicon oil, both are separated into two phases because the alcohol is almost insoluble in the silicon oil. Accordingly, when an amount of alcohol in the oscillation damping liquid is large, a part of the alcohol in the oscillation damping liquid agitated at the time of excitation remains between the contact member and the inertia ball, whereby the alcohol presents conductivity. Consequently, the insulation resistance in the stationary state of the switch is reduced to the predetermined value such as 100 MΩ or below. However, an experiment carried out by the inventors confirms that the insulation resistance in the stationary state of the switch can be increased to the predetermined value such as 100 MΩ or above when the amount of alcohol is 10% or below in the volume ratio. Preferably, when the amount of alcohol is 5% or below, the "on" signal generated in excitation of the acceleration responsive switch does not contain intermittent disturbance caused by the conductivity of the alcohol and shorting due to metal-to-metal contact.

When the acceleration responsive switch is operated in the atmosphere of a low temperature such as −30° C., the viscosity of hexane contained in the oscillation damping liquid is increased. The period of the output signal is shortened accordingly. In the present invention, however, the oscillation damping liquid contains alcohol. Consequently, the acceleration responsive switch can reliably generate the "on" signal in response to the seismic wave or a predetermined oscillation and the "on" signal can be prevented from having an intermittent waveform even when the switch is operated in the low temperature atmosphere. Thus, the acceleration responsive switch can reliably generate a stable signal on which the microcomputer is operated in a wide temperature range.

The signal generated by the acceleration responsive switch is thus stable at the atmospheric temperature of 0° C. or below when the oscillation damping liquid contains alcohol while it is unstable when the oscillation damping liquid consists of hydrocarbon such as hexane, fluorine inert liquid or silicon oil. The following is a possible reason for this. The oscillation damping liquid at least containing alcohol is employed in the acceleration responsive switch in accordance with the present invention. Since a slight amount of water content is dissolved in the alcohol and the freezing point of the water content is lowered, the water content is not frozen when the acceleration responsive switch is used in the low temperature atmosphere. Accordingly, the contact between the contact member and the inertia ball is not prevented by the water content. The water content in the oscillation damping liquid reacts to the alkyl group of the silane coupling agent to thereby produce alcohol when a predetermined amount of a silane coupling agent such as methyltrimethoxysilane, methyltriethoxysilane or vinyltrimethoxysilane is dissolved or mixed in the main liquid of the oscillation damping liquid, instead of alcohol or when the oscillation damping liquid consists of a silane coupling agent. Consequently, since the water content is removed, the operation of the switch in the low temperature atmosphere can be rendered reliable. In this case, the oscillation damping liquid should not be limited by alcohol or silane coupling agent. If the conductivity between the contact member and the housing cannot be prevented by the water content in the oscillation damping liquid in the low temperature atmosphere, an isocyanic acid material such as isocyanate-ethylmethaclate reacting to the water content to thereby produce carbon dioxide may be used.

Figure 39:
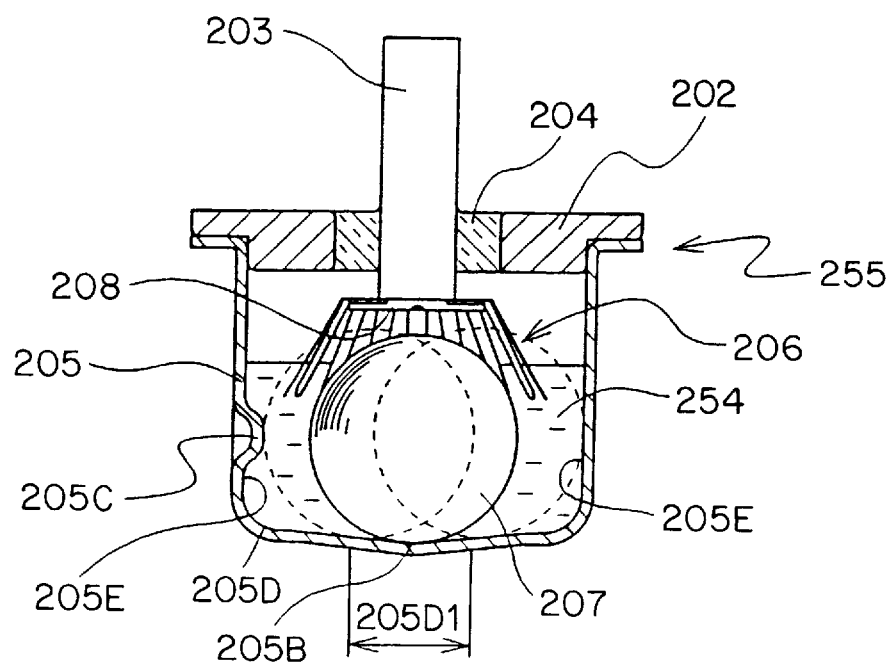
FIG. 39 is a longitudinal sectional view of a seventeenth embodiment of an acceleration responsive switch in accordance with the present invention.

FIG. 39 illustrates an acceleration responsive switch of a seventeenth embodiment in accordance with the present invention. The acceleration responsive switch 255 comprises a housing 205 having the same structure as in the twelfth embodiment and the oscillation damping liquid 254 contained in the housing 205. The oscillation damping liquid 254 is a mixture of the main liquid such as the hydrocarbon soluble in alcohol or the silicon oil insoluble in alcohol and alcohol. In the case where the acceleration responsive switch of the seventeenth embodiment is used in the low temperature atmosphere, the viscosity of the oscillation damping liquid is increased in the low temperature atmosphere when the viscosity of the oscillation damping liquid is set for a value suitable for the use at the room temperature. Since a force of the oscillation damping liquid preventing the movement of the inertia ball is increased, the period of the contact of the inertia ball with the contact member is shortened even when the predetermined oscillation is applied to the acceleration responsive switch. Consequently, the generated "on" signal does not have the above-described period of 40 milliseconds. Furthermore, the inertia ball 207 is not brought into contact with the contact member, so that no signal is generated. In the present invention, however, the viscosity of the oscillation damping liquid 254 is selected so as to take a suitable value even when the switch is used in its lowest operating temperature. For example, the dynamic viscosity of hexane as a hydrocarbon is about 1 centistokes at −30° C., and the "on" signal having the predetermined time length is generated by the switch when it is excited by an oscillation having the acceleration of 130 gal. This acceleration is in the above-described range from 80 to 250 gal, which range corresponds to the Seismic intensity 5.

Furthermore, in an impact test at −30° C., the rolling motion of the inertia ball 207 is terminated in 10 seconds or below by the effect of the oscillation damping liquid and the collision portion. Consequently, the microcomputer does not make an erroneous determination as to occurrence of an earthquake even when an impact caused by a flying object, such as a playing ball, is applied to the gas flowmeter incorporating the acceleration responsive switch of the embodiment.

On the other hand, the viscosity of the oscillation damping liquid becomes too low in the high temperature atmosphere when the viscosity is selected so as to take the suitable value even in the low temperature atmosphere. Consequently, sufficient restriction on the rotational movement of the inertia ball by the oscillation damping liquid cannot be obtained. However, the reduction in the restriction by the oscillation damping liquid 254 can be compensated by the protrusions 205C formed on the inner surface of the housing 205C.

In view of the foregoing, the dynamic viscosity of the oscillation damping liquid 254 containing hexane as the main liquid is 0.4 centistokes or below at the ambient temperature of 60° C. In this case, the inertia ball 207 starts to roll at 120 gal when the acceleration responsive switch is subjected to the oscillation having the sinusoidal wave form.

In an impact test at 60° C., the rolling motion of the inertia ball is terminated in 15 to 20 seconds when the housing has no protrusions while the rolling motion of the inertial ball 207 is terminated in 10 seconds or below by the associated effect of the oscillation damping liquid 254 and the protrusions 205C. Consequently, the microcomputer incorporated in the gas flowmeter on which the switch of the embodiment is mounted does not make an erroneous determination as to occurrence of an earthquake in response to the impact caused by collision of a ball or a man against the gas flowmeter.

In making the acceleration responsive switch 255 of the embodiment, the main liquid of the oscillation damping liquid 254 is uniformly mixed with alcohol, and in this state, the oscillation damping liquid 254 is poured into the housing 205. Consequently, the pouring work can be simplified and the mixing ratio of the alcohol in the oscillation damping liquid can be fixed. For this purpose, a liquid such as hydrocarbon, in which alcohol is soluble is selected as the main liquid of the oscillation damping liquid. The oscillation damping liquid is poured into the housing after alcohol is previously dissolved in the main liquid at a predetermined mixing ratio. Alternatively, when a liquid, such as silicon oil, in which alcohol is insoluble is selected as the main liquid, the oscillation damping liquid is agitated so that a uniform alcohol distribution can be obtained. In this state, the oscillation damping liquid is poured into the housing. Or, an amount of the main liquid corresponding to that for one acceleration responsive switch and alcohol is mixed at the predetermined mixing ratio in a cylinder, and then, the mixture is poured into the housing. According to the above-described pouring manners, the assembling apparatus and particularly, the pouring mechanism thereof can be simplified and the assembly of the switch can be rendered easy as compared with the case where two kinds of liquids are separately poured into the housing.

The foregoing disclosure and drawings are merely illustrative of the principles of the present invention and are not to be interpreted in a limiting sense. The only limitation is to be determined from the scope of the appended claims.

What is claimed is:

1. An acceleration responsive device which includes a seismosensitive element comprising:
    a) a housing formed from an electrically conductive material and having a bottom and an open end, the housing having an inclined face formed on the bottom thereof to gently rise concentrically outwardly substantially from a center of the bottom thereof;
    b) a header fixed to the housing to close the open end thereof and having a through-aperture in which an electrically conductive terminal pin is fixed in an insulated relation with the header;
    c) a contact member formed from an electrically conductive material and fixed to an end of the terminal pin located inside the housing, the contact member having a plurality of feather portions including respective contact portions disposed concentrically with the terminal pin, the feather portions having a predetermined elasticity; and
    d) an inertia ball enclosed in the housing to be located substantially at the center in the housing in a normal attitude thereof in a stationary state, the inertia ball moving when subjected to oscillation, so that the inertia ball slides on the feather portions of the contact member except for distal ends of the feather portions such that the inertia ball electrically conducts between the contact member and the housing and such that the feather portions are elastically deformed, thereby receiving a force causing the same to be pushed against the bottom of the housing.

2. An acceleration responsive device according to claim 1, wherein a bound force based on a resultant force (F2+F3) of a first composite force (F2) of a first frictional force (F1) and a second frictional force (F3) is set to be smaller than a second resultant force (F4+F5) of a second composite force (F4) of a repulsive force applied to the inertia ball by the feather portions of the contact member and a third composite force (F5) where the first composite force (F2) acts between the inertia ball and the feather portions in a movable range of the inertial ball in a direction parallel to the bottom of the housing, the second frictional force (F3) acts between the inertia ball and the bottom of the housing, the second composite force (F4) acts in the direction parallel to the bottom of the housing, and the third composite force (F5) generated by a weight of the inertia ball acts in the direction parallel to the bottom of the housing.

3. An acceleration responsive device according to claim 2, wherein an amount of deflection of each feather portion of the contact member is set in a range of 0.25 to 5 mm when a force corresponding to the weight of the inertia ball is applied to a contact point of feather portion with the inertia ball.

4. An acceleration responsive device according to claim 2, wherein an inner diameter of the housing is less than a value corresponding to an addition of a diameter of the inertia ball to 4 mm, and an inclination of the bottom of the housing ranges between 4 and 10 degrees.

5. An acceleration responsive device according to claim 2, wherein $45°<\beta_0<75°$ where $\beta_0$ is an angle of a horizontal plane and a portion of the inertia ball where the same is in contact with the feather portion of the contact member in a free state thereof and $\alpha+\beta \geqq 40°$ where $\alpha$ is an angle of the housing bottom relative to the horizontal plane and $\beta$ is an inclination of the contact member relative to the horizontal plane.

6. An acceleration responsive device according to claim 2, wherein the bottom of the housing has a central hollow rest portion where the inertia ball rests in a normal attitude thereof to be held in position by gravity and the inertia ball departs the hollow rest portion when subjected to an oscillation with a predetermined acceleration.

7. An acceleration responsive device according to claim 6, wherein the hollow rest portion has a radius 0.1 to 0.25 times as small as a radius of the inertia ball.

8. An acceleration responsive device according to claim 2, further comprising a protector provided in a vicinity of a portion of the terminal pin where the contact member is secured and having a predetermined rigidity for preventing permanent deformation of the contact member due to collision with the inertia ball.

9. An acceleration responsive device according to claim 2, wherein a surface treatment is applied to a surface of the inertia ball, at least a portion of each of the contact member and the inner surface of the housing with which a portion the inertia ball comes into contact, for preventing the conductivity of the inertia ball and the portion of each of the contact member and the inner surface of the housing from being damaged by an atmosphere in which the device is used.

10. An acceleration responsive device according to claim 2, wherein the header seals the housing.

11. An acceleration responsive device according to claim 2, wherein the header seals the housing and a pollution preventing gas is contained in the sealed housing.

12. An acceleration responsive device according to claim 1, wherein an amount of deflection of each feather portion of the contact member is set in a range of 0.25 to 5 mm when a force corresponding to the weight of the inertia ball is applied to a contact point of each feather portion with the inertia ball.

13. An acceleration responsive device according to claim 1, wherein an inner diameter of the housing is less than a value corresponding to an addition of a diameter of the inertia ball to 4 mm, and an inclination of the bottom of the housing ranges between 4 and 10 degrees.

14. An acceleration responsive device according to claim 1, wherein $45°<\beta_0<75°$ where $\beta_0$ is an angle of a horizontal plane and a portion of the inertia ball where the same is in contact with the feather portion of the contact member in the free state thereof and $\alpha+\beta \geqq 40°$ where $\alpha$ is an angle of the housing bottom relative to the horizontal plane and $\beta$ is an inclination of the contact member relative to the horizontal plane.

15. An acceleration responsive device according to claim 1, wherein the bottom of the housing has a central hollow rest portion where the inertia ball rests in a normal attitude thereof to be held in position by gravity and the inertia ball departs the hollow rest portion when subjected to an oscillation with a predetermined acceleration.

16. An acceleration responsive device according to claim 15, wherein the hollow rest portion has a radius 0.1 to 0.25 times as small as a radius of the inertia ball.

17. An acceleration responsive device according to claim 1, further comprising a protector provided in a vicinity of a portion of the terminal pin where the contact member is secured and having a predetermined rigidity for preventing permanent deformation of the contact member due to collision with the inertia ball.

18. An acceleration responsive device according to claim 1, wherein a surface treatment is applied to a surface of the inertia ball, at least a portion of each of the contact member and the inner surface of the housing with which a portion the inertia ball comes into contact, for preventing the conductivity of the inertia ball and the portion of each of the contact member and the inner surface of the housing from being damaged by an atmosphere in which the device is used.

19. An acceleration responsive device according to claim 1, wherein the header seals the housing.

20. An acceleration responsive device according to claim 19, further comprising a suspending member provided outside the device, a support supporting the suspending member at a predetermined position and a casing enclosing the sealed housing which a liquid having a preselected viscosity, wherein the casing is mounted so as to be ranged in a predetermined allowable tilt angle such that the sealed housing is caused by gravity to assume the normal attitude and the inertia ball in the sealed housing rolls when the casing is subjected to an acceleration due to oscillation, thereby cutting off an electrical path.

21. An acceleration responsive device according to claim 1, wherein the header seals the housing and a pollution preventing gas is contained in the sealed housing.

22. An acceleration responsive device according to claim 1, further comprising a suspending member provided outside the device, a support supporting the suspending member at a predetermined position and a casing enclosing the sealed housing with a liquid having a preselected viscosity, wherein the casing is mounted so as to be ranged in a predetermined allowable tilt angle such that the sealed housing is caused by gravity to assume the normal attitude and the inertia ball in the sealed housing rolls when the casing is subjected to an acceleration due to oscillation, thereby cutting off an electrical path.

23. An acceleration responsive switch comprising:
  a) a receptacle including a bottomed cylindrical, electrically conductive housing having an inclined face formed on an inner bottom face so as to gently rise concentrically outwardly substantially from a center of the inner bottom face and a header fixed to the housing to close an open end of the housing and having a through-aperture;
  b) a lead terminal fixed in the through-aperture of the header so as to extend through the header and be electrically insulated from the housing;
  c) a contact member secured to an end of the lead terminal located in the housing and including a plurality of feather portions arranged radially to be approximately concentric with the housing, each of the feather portions having a predetermined elasticity;
  d) an electrically conductive inertia ball enclosed in the receptacle so as to be capable of rolling on the inner bottom face of the housing, the inertia ball being located substantially at the center of the inner bottom face of the housing in a normal attitude thereof in a stationary state due to the inclined face of the inner bottom face of the housing, the inertia ball moving to a position spaced from the center of the inner bottom face of the housing when subjected to an oscillation, so that the inertia ball contacts one or more of the feather portions of the contact member, thereby electrically conducting between the feather portions and the housing; and e) a collision portion formed on a portion of an inner peripheral wall of the housing adjacent which a portion where the inertia ball rotates, sliding in touch with the feather portions of the contact member, the inertia ball colliding against the collision portion while rolling, thereby changing a course of movement thereof.

24. An acceleration responsive switch according to claim 23, wherein the header is hermetically secured to the open end of the housing so that a hermetic receptacle is provided.

25. An acceleration responsive switch according to claim 24, further comprising a predetermined amount of oscillation damping liquid contained in the hermetic receptacle with the inertia ball, the oscillation damping liquid having a viscosity suitable to apply resistance to the inertia ball so that the inertia ball ceases rotating when an external oscillation previously applied to the inertia ball stops.

26. An acceleration responsive switch according to claim 24, wherein a pollution preventing gas is contained in the hermetic receptacle.

27. An acceleration responsive switch comprising:
a) a hermetic receptacle including a bottomed cylindrical, electrically conductive housing having an inclined face formed on an inner bottom face so as to gently rise concentrically outwardly substantially from a center of the inner bottom face and a header fixed to the housing to hermetically close an open end of the housing and having a through-aperture;
b) a lead terminal hermetically fixed in the through-aperture of the header so as to extend through the header and be electrically insulated from the housing;
c) a contact member secured to an end of the lead terminal located in the housing and including a plurality of feather portions arranged radially to be approximately concentric with the housing, each of the feather portions having a predetermined elasticity;
d) an electrically conductive inertia ball enclosed in the hermetic receptacle so as to be capable of rolling on the inner bottom face of the housing, the inertia ball being located substantially at the center of the inner bottom face of the housing in a normal attitude thereof in a stationary state due to the inclined face of the inner bottom face of the housing, the inertia ball moving to a position spaced from the center of the inner bottom face of the housing when subjected to an oscillation, so that the inertia ball contacts one or more of the feather portions of the contact member, thereby electrically conducting between the feather portions and the housing; and
e) an oscillation damping liquid contained in the hermetic receptacle with the inertia ball, the oscillation damping liquid having a viscosity suitable to apply resistance to the inertia ball so that the inertia ball ceases rotating when an external oscillation previously applied to the inertia ball stops.

28. An acceleration responsive switch according to claim 27, wherein a pollution preventing gas is contained in the hermetic receptacle.

29. A method of making an acceleration responsive switch comprising the steps of:
a) obtaining a bottomed cylindrical, electrically conductive housing having an inclined face formed on an inner bottom face so as to gently rise concentrically outwardly substantially from a center of the inner bottom face;
b) obtaining a header having a through-aperture in which a lead terminal is hermetically fixed so as to extend through the header and be electrically insulated from the header, the lead terminal having an end to which a contact member including a plurality of feather portions is secured, the feather portions being arranged radially to be approximately concentric with the housing and each having a predetermined elasticity;
c) enclosing an electrically conductive inertia ball in the housing;
d) accommodating an oscillation damping liquid in the housing, the oscillation damping liquid having a viscosity suitable to apply resistance to the inertia ball so that the inertia ball ceases rotating when an external oscillation previously applied to the inertia ball stops;
e) reducing pressure in an interior of the housing accommodating the inertia ball and the oscillation damping liquid therein to a predetermined value and subsequently, filling the housing with a pollution preventing gas; and
f) hermetically securing the header to the open end of the housing so that the contact member is located in the housing, subsequently to the step of filling the housing with the pollution preventing gas.

30. A method of making an acceleration responsive switch comprising the steps of:
a) obtaining a bottomed cylindrical, electrically conductive housing having an inclined face formed on an inner bottom face so as to gently rise concentrically outwardly substantially from a center of the inner bottom face;
b) obtaining a header having a through-aperture in which a lead terminal is hermetically fixed so as to extend through the header and be electrically insulated from the header, the lead terminal having an end to which a contact member including a plurality of feather portions is secured, the feather portions being arranged radially to be approximately concentric with the housing and each having a predetermined elasticity;
c) enclosing an electrically conductive inertia ball in the housing;
d) accommodating an oscillation damping liquid in the housing, the oscillation damping liquid having a viscosity suitable to apply resistance to the inertia ball so that the inertia ball ceases rotating when an external oscillation previously applied to the inertia ball stops;
e) causing a pollution preventing gas to flow through an interior of the housing accommodating the inertia ball and the oscillation damping liquid therein until a predetermined rate of inert gas replacement is reached; and
f) hermetically securing the header to the open end of the housing so that the contact member is located in the housing, subsequently to the step of causing the pollution preventing gas to flow through the interior of the housing.

31. A method of making an acceleration responsive switch comprising the steps of:
a) obtaining a bottomed cylindrical, electrically conductive housing having an inclined face formed on an inner bottom face so as to gently rise concentrically outwardly substantially from a center of the inner bottom face;
b) obtaining a header fixed to an open end of the housing and having a through-aperture in which a lead terminal is hermetically fixed so as to extend through the header, the lead terminal having an end to which a contact member including a plurality of feather portions is secured, the feather portions being arranged radially to be approximately concentric with the housing and each having a predetermined elasticity;

c) enclosing an electrically conductive inertia ball in the housing;

d) reducing pressure in an interior of the housing accommodating the inertia ball therein to a predetermined value and subsequently, filling the interior of the housing with a pollution preventing gas until a predetermined ratio of inert gas replacement is reached;

e) pouring an oscillation damping liquid into the housing subsequently to the step of filling the interior of the housing with the pollution preventing gas, the oscillation damping liquid having a viscosity suitable to apply resistance to the inertia ball so that the inertia ball ceases rotating when an external oscillation previously applied to the inertia ball stops; and f) hermetically securing the header to the open end of the housing so that the contact member is located in the housing, subsequently to the step of pouring the oscillation damping liquid into the housing.

* * * * *